(12) United States Patent
Jeon et al.

(10) Patent No.: US 12,742,332 B2
(45) Date of Patent: Sep. 22, 2026

(54) METHOD FOR CONSTRUCTING ACCESS FLOOR BY USING UNMANNED ROBOT

(71) Applicant: SAMSUNG C&T CORPORATION, Seoul (KR)

(72) Inventors: Hae Moon Jeon, Seoul (KR); Yunjae Heo, Incheon (KR); Sang Heon Lee, Hwaseong-si (KR); Seongyeong Yang, Seoul (KR); Kun Sub Kim, Seoul (KR); Eunyoung Jung, Suwon-si (KR); Jongeui Song, Seoul (KR); Kye Young Lee, Seoul (KR); Seunghyeok Lee, Osan-si (KR); Suengjae Lee, Seongnam-si (KR)

(73) Assignee: SAMSUNG C&T CORPORATION, Seoul (KR)

( * ) Notice: Subject to any disclaimer, the term of this patent is extended or adjusted under 35 U.S.C. 154(b) by 937 days.

(21) Appl. No.: 18/013,809

(22) PCT Filed: Jun. 21, 2021

(86) PCT No.: PCT/KR2021/007737
§ 371 (c)(1),
(2) Date: Dec. 29, 2022

(87) PCT Pub. No.: WO2022/005078
PCT Pub. Date: Jan. 6, 2022

(65) Prior Publication Data

US 2023/0295935 A1 Sep. 21, 2023

(30) Foreign Application Priority Data

Jun. 30, 2020 (KR) ........................ 10-2020-0080274

(51) Int. Cl.
*E04F 21/18* (2006.01)
*B25J 11/00* (2006.01)
(Continued)

(52) U.S. Cl.
CPC ......... *E04F 21/1872* (2013.01); *B25J 11/008* (2013.01); *B25J 15/008* (2013.01); *B25J 15/0616* (2013.01)

(58) Field of Classification Search
CPC ................ E04F 21/1872; E04F 15/024; E04F 15/02405; E04F 15/02447; E04F 21/20;
(Continued)

(56) References Cited

U.S. PATENT DOCUMENTS 2,173,622 A * 9/1939 Crooks .................. E04F 21/20 52/390
2013/0000246 A1* 1/2013 Bourelle .............. E04F 21/162 52/749.1
2020/0024853 A1* 1/2020 Furrer ...................... B25J 9/163

FOREIGN PATENT DOCUMENTS

CN 110905177 3/2020
EP 4 166 733 4/2023
(Continued)

OTHER PUBLICATIONS

Extended European Search Report and Communication pursuant to Rules 70(2) and 70a(2) for European Application No. 21834600.5, dated Jun. 12, 2024 and Jul. 2, 2024.
(Continued)

*Primary Examiner* — Christopher Garft
(74) *Attorney, Agent, or Firm* — KILE PARK REED & HOUTTEMAN PLLC

(57) ABSTRACT

The present invention provides a method for constructing an access floor by using unmanned robot, the method comprising: a first step (S100) of constructing an installation frame (10) and a peripheral slab (60) formed on the periphery of the installation frame; a second step (S200) of positioning the unmanned robot on the peripheral slab (60); and a third step (S300) of coupling a floor (30) to the installation frame (10) by the unmanned robot while moving along the periph-
(Continued)

eral slab (60). According to the present invention, an automated robot can install a mat and floor in place of a worker performing dangerous floor installation work, so as to prevent the occurrence of workplace safety accidents. Furthermore, through the installation of a mat and floor by the robot, floor installation location selection and leveling work can be quickly performed, so as to reduce the construction costs and shorten the construction period.

14 Claims, 28 Drawing Sheets

(51) Int. Cl.
*B25J 15/00* (2006.01)
*B25J 15/06* (2006.01)

(58) Field of Classification Search
CPC ........ E04F 21/22; B25J 11/008; B25J 15/008; B25J 15/0616; B25J 13/006; B25J 15/0019; B25J 9/1687
USPC .............................................................. 294/2
See application file for complete search history.

(56) References Cited

FOREIGN PATENT DOCUMENTS

| | | |
|---|---|---|
| JP | 6-26205 | 2/1994 |
| JP | 2018-123645 | 8/2018 |
| JP | 2020-22982 | 2/2020 |
| KR | 10-1454705 | 10/2014 |

OTHER PUBLICATIONS

International Search Report for International Application No. PCT/KR2021/007737, dated Oct. 7, 2021.

Written Opinion for International Application No. PCT/KR2021/007737, dated Oct. 7, 2021.

* cited by examiner

METHOD FOR CONSTRUCTING ACCESS FLOOR BY USING UNMANNED ROBOT

TECHNICAL FIELD

The present invention disclosed herein relates to a method for constructing an access floor by using an unmanned robot, and more particularly, to a method for constructing an access floor by using an unmanned robot, which is capable of constructing an access floor by using a pad installation robot, a floor installation robot, and a bolting robot, each of which has a specific structure for constructing the access floor, without providing manpower.

BACKGROUND ART

An access floor is a compound word of access (a job of inputting and extracting information in a computer system as a computer term) and a floor (ground). Thus, the access floor is also called a raised floor, a double floor, or O/A floor.

The access floor represents a raised floor suggested to secure a more convenient and efficient office space in the information age in which use of computers is increasing.

In general, since fine or ultra-fine dust or mist has a significant effect on a product quality in a place requiring a clean or super-clean state, such as semiconductor fabs, TFT-LCD fabs, PDP fabs, pharmaceutical or food manufacturing factories, workshops that produce or assemble optical products or printing or precision devices, and operating rooms, provided is a clean room with a raised floor for maintaining temperature and humidity within a predetermined range through constant temperature and humidity control as well as strictly blocking the outside.

The access floor represents a feature of creating another floor by providing a space having a certain height on a flat floor to satisfy the above-described needs. Also, the access floor is formed so that cables are arranged in the space, and the floor is openable and closeable depending on necessity of rearrangement of the cables.

In general, the access floor is constructed by forming an installation frame and then forming a pad and a floor on the installation frame by a worker.

However, the construction of the access floor corresponds to a work that a professional technician avoids because the installation frame has a height of about 3 m to 9 m, and a risk of a worker's falling accident exists. Thus, training to be a skilled professional technician is difficult.

Also, costs and time required for securing safety are excessively required because a safety net or a lifeline is required for securing safety of a worker. In addition, a worker who installs the floor always undergoes musculoskeletal disorders because the floor is a heavy object having a weight of about 20 kg, and an overall process is prolonged because difficulty of a leveling work of the floor that is a heavy object is extremely high.

DISCLOSURE OF THE INVENTION

Technical Problem

The present invention that is derived to solve the above-described problem of typical access floor construction provides an unmanned access floor construction system capable of preventing occurrence of workplace safety accidents by enabling an automated robot to install a mat and floor without performing a dangerous floor installation work by a worker and a method for constructing an access floor using the same.

The present invention also provides an unmanned access floor construction system capable of reducing construction costs and shortening a construction period by allowing a floor installation location selection and a leveling work to be performed quickly through installation of a mat and floor by a robot and a method for constructing an access floor using the same.

The present invention also provides a method for constructing an access floor, which is capable of securing a certain level of construction quality by constructing most of access floors using a robot.

Technical Solution

According to one aspect of the present invention, a method for constructing an access floor by using an unmanned robot includes: a first step S100 of constructing an installation frame 10 and a peripheral slab 60 formed on a periphery of the installation frame; a second step S200 of positioning the unmanned robot on the peripheral slab 60; and a third step S300 of coupling a floor 30 to the installation frame 10 by the unmanned robot while moving along the peripheral slab 60.

In this case, the unmanned robot may include: a pad installation robot 100 configured to attach a pad 20 to the installation frame 10; a floor installation robot 200 configured to mount the floor 30 on the pad 20; and a bolting robot 300 configured to fasten the pad 20 and the floor 30 by using a fastening means 40, and the third step S300 may include: a pad attaching step S310 of attaching the pad 20 to the installation frame 10 by using the pad installation robot 100; a floor mounting step S320 of mounting the floor 30 to the pad 20 by using the floor installation robot 200; and a pad and floor fastening step S330 of fastening the pad 20 and the floor 30 by using the fastening means 40 of the bolting robot 300.

Also, the pad installation robot 100 may include: a first detection sensor 110 configured to sense an installation position 11 of the pad 20 on the installation frame 10; a first installation arm 120 configured to move the pad 20 to the installation position 11; a first transportation means 130 configured to move the first installation arm 120; and an adhesive supply part 140 configured to supply an adhesive to a bottom surface of the pad 20, and the pad attaching step S310 may include: an adhesive applying step S311 of gripping the pad 20 by the first installation arm 120 and applying the adhesive supplied from the adhesive supply part 140 to a rear surface of the pad 20; and a pad installation step S312 of transporting the pad 20 by the first installation arm 120 so that the rear surface of the pad 20 contacts a top surface of the installation frame 10.

Also, the floor installation robot 200 may include: a transportation unit 210 configured to transport the floor 30 in a loaded state; and an installation unit 220 configured to mount the floor 30 disposed on the transportation unit 210 to the pad 20, and the floor mounting step S320 may include: a transportation step S321 of moving the floor 30 to a periphery of the installation unit 220 by using the transportation unit 210; and a mounting step S322 of mounting the floor 30 loaded on the transportation unit 210 to the pad 20 by using the installation unit 220.

Also, the installation unit 220 may include: a second detection sensor 221 configured to sense a mounting position 12 of the floor 30; a second installation arm 222 configured to move the floor 30 to the mounting position 12; and a second transportation means 230 configured to move the second installation arm 222, and the mounting step S322 may include: a sensing step S3221 of sensing the mounting position 12 of the floor 30 by using the second detection sensor 221; and a moving step S3222 of moving the floor 30 loaded on the transportation unit 210 to the mounting position 12 by using the second installation arm 222.

Also, the bolting robot 300 may include: a third detection sensor 310 configured to sense an insertion hole 13 to which the fastening means 40 is inserted; a third installation arm 320 configured to move the fastening means 40 to the insertion hole 13; and a third transportation means 330 configured to move the third installation arm 320, and the pad and floor fastening step S330 may include: an insertion hole sensing step S331 of sensing the insertion hole 121 by using the third detection sensor 310; and a fastening means transportation step S332 of moving the fastening means 40 to the insertion hole 13 by using the third installation arm 320.

Also, the bolting robot 300 may further include a bolting part 340 configured to fasten the fastening means 40 to the insertion hole 13, and the pad and floor fastening step S330 may further include a bolting step S333 of fastening the fastening means 40 to the insertion hole 13 by using the bolting part 340.

Also, the bolting robot 300 may further include a horizontal level measuring part 350 configured to measure a horizontal level of the floor 30, and the pad and floor fastening step S330 may be performed only when a horizontal level A measured by the horizontal level measuring part 350 is within a predetermined value.

Also, the unmanned robot may include: a position sensor 410 configured to generate position information B on a current position; and a distance sensor 420 configured to generate distance information C on a distance between a plurality of unmanned robots.

Also, the first step S100 may include an elevator construction step S110 of constructing an elevator 50 configured to transport the unmanned robot to a level of the peripheral slab 60.

Also, the first installation arm 120 may include: a first gripper 121 configured to suction the pad 20; and a second gripper 122 configured to surround a side surface and a bottom surface of the pad 20 suctioned to the first gripper 121.

Also, the first gripper 121 may use a vacuum suction method, and the second gripper 122 may include: a first guide part **122*a* protruding from an end of the first installation arm 120 in a downward direction a; and a second guide part 122*b* extending from the first guide part 122*a* in an inward direction b, in which the first guide part 122*a* is hinged with respect to the first installation arm 120**.

Also, the second guide part **122*b* may be: hinged in the inward direction b in a state in which the pad 20 is suctioned to the first gripper 121; and hinged in an outward direction c in a state in which the pad 20 is separated from the first gripper 121**.

Also, the pad installation robot 100 may further include a main body 150 on which the first installation arm 120 is mounted, the adhesive supply part 140 may be disposed on the main body 150, and a discharge hole 141 through which an adhesive is discharged may be defined in the adhesive supply part 140.

According to another aspect of the present invention, provided is an access floor constructed by the method for constructing the access floor.

Advantageous Effects

According to the present invention, the occurrence of workplace safety accidents may be prevented by enabling an automated robot to install the mat and the floor without performing a dangerous floor installation work by the worker.

According to the present invention, the construction costs may be reduced, and the construction period may be shortened by allowing the floor installation location selection and the leveling work to be performed quickly through the installation of the mat and floor by the robot.

According to the present invention, a certain level of construction quality may be secured by constructing most of the access floors using the robot.

MODE FOR CARRYING OUT THE INVENTION

Hereinafter, embodiments of a method for constructing an access floor by using an unmanned robot according to the present invention will be described in more detail with reference to the accompanying drawings and, while describing of the accompanying drawings, the same or corresponding components are given with the same drawing number. Therefore, redundant description thereof will be omitted.

Also, though terms like a first and a second are used to describe various members, components, regions, layers, and/or portions in various embodiments of the present invention, the members, components, regions, layers, and/or portions are not limited to these terms.

When it is described that an element is "coupled to", "engaged with", or "connected to" another element, it should be understood that the element may be directly coupled or connected to the other element but still another element may be "coupled to", "engaged with", or "connected to" the other element between them.

The present invention relates to a method for constructing an access floor by using an unmanned robot, which allows unmanned construction of an access floor.

The access floor constructed by the method for constructing the access floor by using the unmanned robot according to an embodiment of the present invention includes an installation frame 10, a pad 20 attached to the installation frame 10, and a floor 30 coupled to the pad 20.

The installation frame 10 that is a basic framework allowing the floor 30 to be spaced a predetermined distance from the ground forms a lower space below the floor 30, in which all sorts of equipment is installed and an air-conditioning system is constructed.

The pad 20 is a component that is generally bonded and installed to the installation frame 10, and one corner of the floor 30 is mounted on the pad 20. In general, four corners of the floor 30 are mounted to a top surface of the pad 20.

Figure 23:
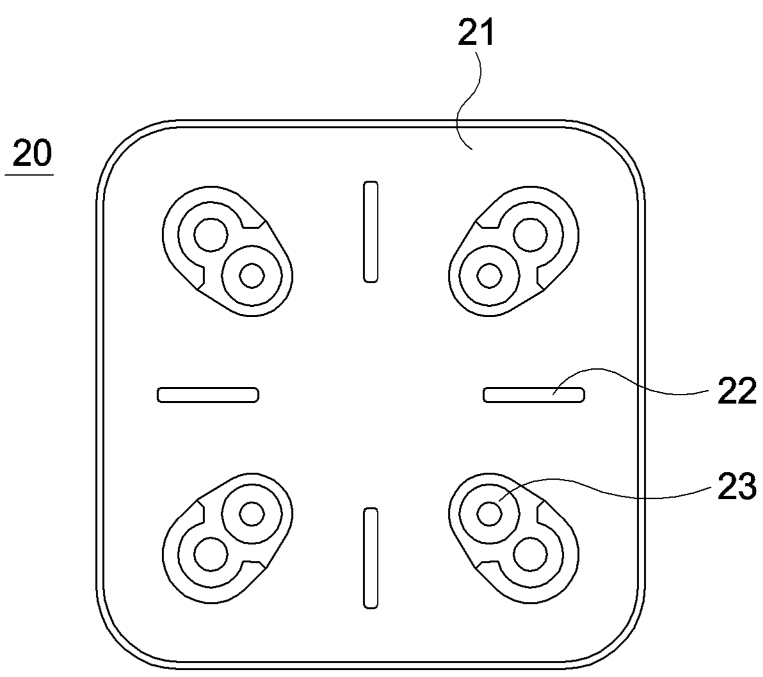
FIG. 23 is a plan view illustrating the pad used for unmanned access floor construction according to an embodiment of the present invention.

The pad 20 may include a mounting part 21 to which the corner of the floor 30 is mounted, a guide part 22 dividing the corners of the floor 20, and a through-hole 23 to which a bolt 41 for fastening the pad 20 to the floor 30 is inserted (refer to FIG. 23).

The pad 20 serves to couple the floor 30 with the installation frame 10 and specify an installation position of the floor 30.

However, since exact leveling and position setting of the floor 30 are difficult when the pad 20 is installed by manpower, there is a problem of requiring a complicated process in which the floor 30 is temporarily installed and then removed again, and the pad 20 is bonded. Accordingly, a problem such as a safety accident and strain on a worker's body occurs because much time is consumed for constructing the access floor, and also a worker needs to install the floor 30 two times.

In order to resolve the above-described problem, the present invention allows the unmanned robot to perform an entire process of installation of the pad 20, mounting of the floor 30, and fastening the pad 20 with the floor 30, which are required for constructing the access floor.

The method for constructing the access floor according to an embodiment of the present invention includes: a first step S100 of constructing an installation frame 10 and a peripheral slab 60 formed on a periphery of the installation frame 100; a second step S200 of positioning the unmanned robot on the peripheral slab 60; and a third step S300 of coupling the floor 30 to the installation frame 10 by the unmanned robot while moving along the peripheral slab 60.

In the present invention, the unmanned robot that is an object of constructing the access floor instead of manpower is connected to a control server 1 by wired or wireless communication.

The control server 1 includes an operation module for drive and movement of the construction robot, and the control server 1 may be mounted to the construction robot itself.

Figure 5:
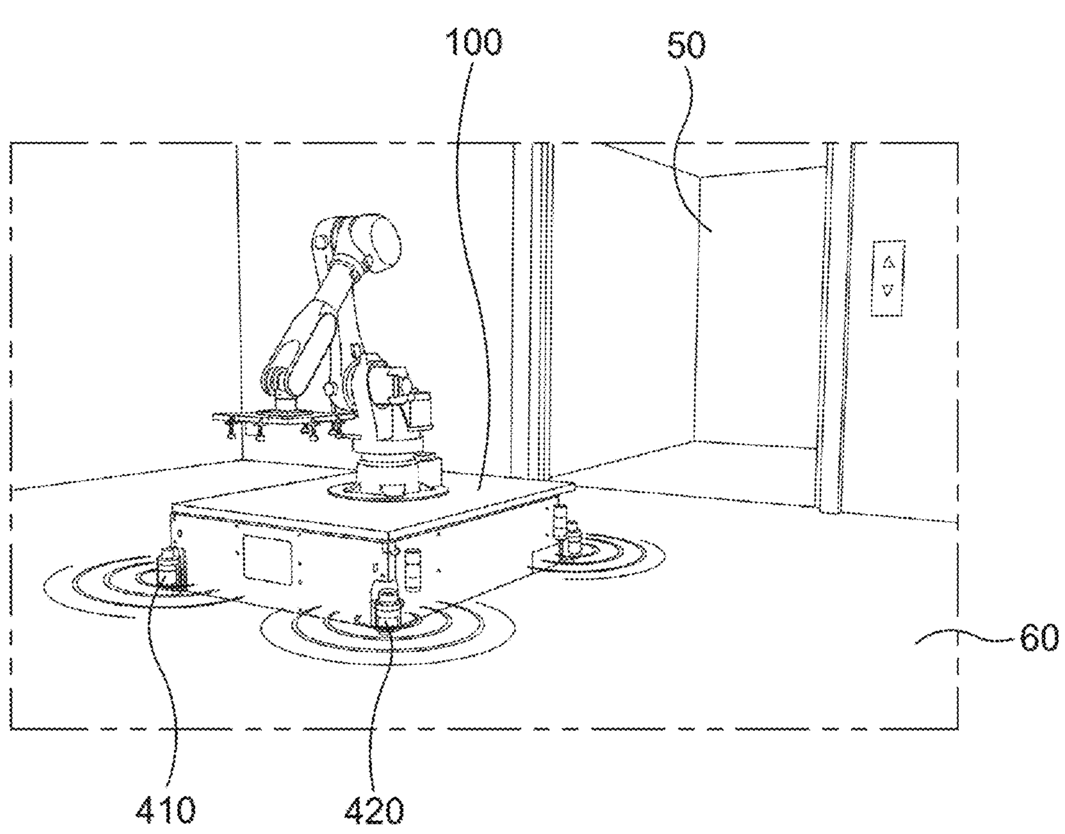
FIG. 5 is a view illustrating a state in which an unmanned robot is inserted to a peripheral slab through an elevator.

In the present invention, the unmanned robot may include a pad installation robot 100 for attaching the pad 20 to the installation frame 10, a floor installation robot 200 for mounting the floor 30 on the pad 20, and a bolting robot 300 for fastening the pad 20 to the floor 30 by using a fastening means 40 (refer to FIG. 5).

Figure 1:
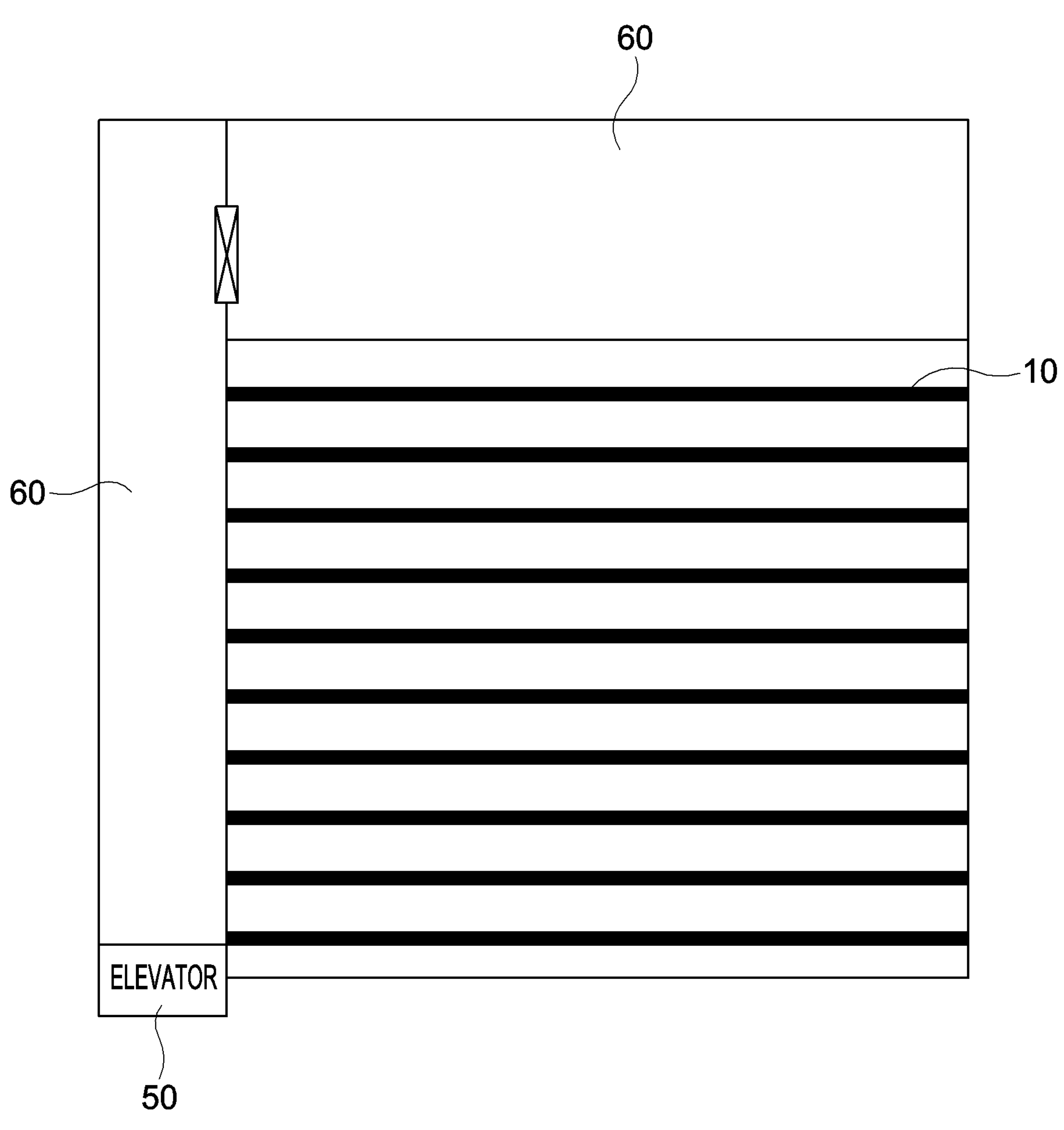
FIG. 1 is a plan view illustrating a configuration of an installation frame, an elevator, and a peripheral slab in a process of constructing an access floor according to an embodiment of the present invention.
Figure 2:
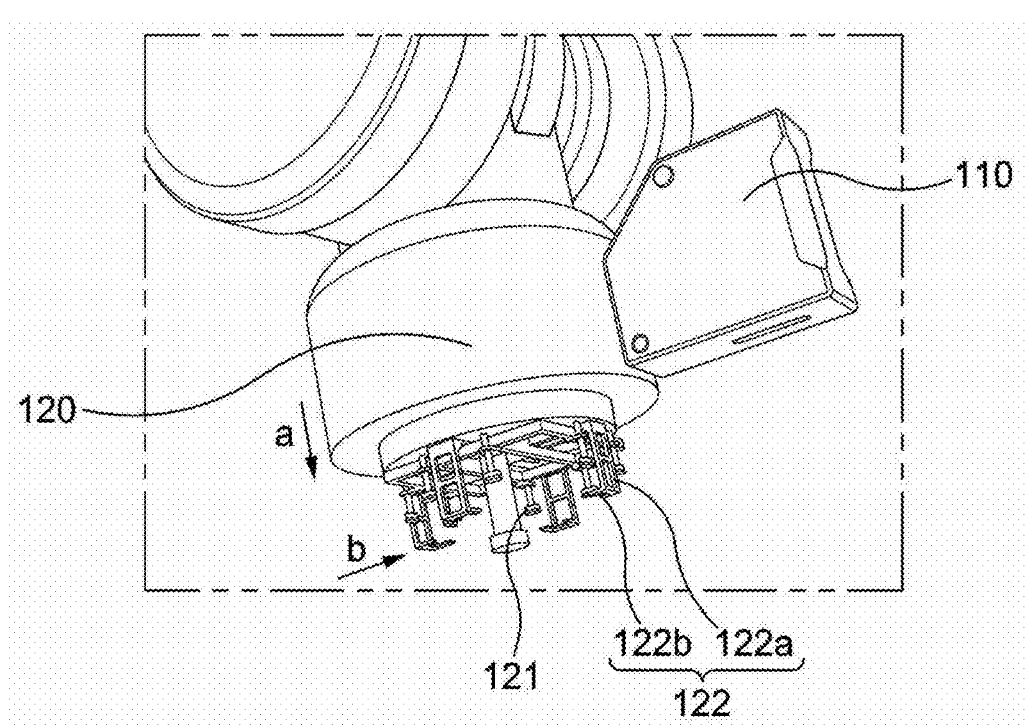
FIG. 2 is detail view illustrating a first installation arm of a pad installation robot according to an embodiment of the present invention.

Specifically, the pad installation robot 100 that is an unmanned robot for attaching the pad 20 to the installation frame 10 (refer to FIGS. 8 to 11) may include a first detection sensor 110 sensing an installation position 11 of the pad 20 on the installation frame 10, a first installation arm 120 moving the pad 20 to the installation position 11, a first transportation means 130 moving the first installation arm 120, and an adhesive supply part 140 supplying an adhesive to a bottom surface of the pad 20 (refer to FIG. 2).

The first detection sensor 110 includes components such as a vision sensor.

The first installation arm 120 that is a component for gripping and moving the pad 20 to the installation position 11 may include a first gripper 121 for suctioning and gripping the pad 20 and a second gripper 122 surrounding a side surface and a bottom surface of the pad 20 suctioned to the first gripper 121.

The first gripper 121 suctions and grips one surface of the pad 20 by a vacuum suction method.

The second gripper 122 serves as a safety device that surrounds the pad 20 so that the pad 20 is not separated from the first installation arm 120 when the pad 20 suctioned to the first gripper 121 is separated due to an impact or an error.

To this end, the second gripper 122 may include a first guide part **122*a* protruding from an end of the first installation arm 120 in a downward direction a and a second guide part 122*b* extending from the first guide part 122*a*** in an inward direction b.

The first guide part **122*a* may be hinged with respect to the first installation arm 120. In this case, the second guide part 122*b* is hinged in the inward direction b to surround the pad 20 suctioned to the first gripper 121 in a state in which the pad 20 is suctioned to the first gripper 121. In comparison, in a state in which the pad 20 is separated from the first gripper 121, the second guide part 122*b* may be hinged in an outward direction c, and the pad 20 separated from the first gripper 121 may be separated from the first installation arm 120**.

The pad installation robot 100 may further include a main body 150 on which the first installation arm 120 is mounted. In this case, the adhesive supply part 140 may be disposed on the main body 150, and a discharge hole 141 through which the adhesive is discharged may be defined in the adhesive supply part 140.

The first installation arm 120 grips the pad 20 loaded on a pad loading part 150 and allows the pad 20 to contact the discharge hole 141 so that the adhesive is applied on a contact surface of the pad 20.

Thereafter, the first installation arm 120 transfers the pad 20 so that the contact surface of the pad 20 contacts the installation position 11.

The floor installation robot 200 serves to mount the floor 30 on the pad 20 (refer to FIGS. 12 to 20). In general, the corner of the floor 30 is mounted on the mounting part 21 of the pad 20.

Figure 6:
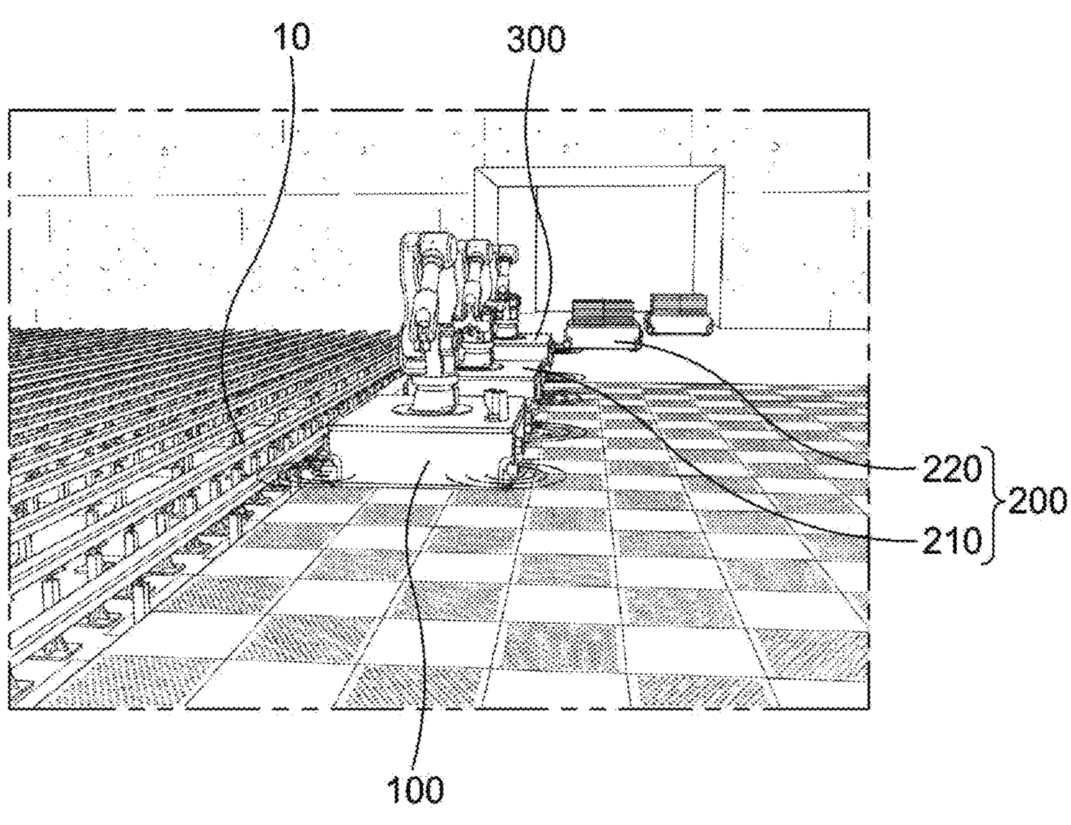
FIGS. 6 and 7 are views illustrating a state in which the unmanned robot is aligned around the installation frame for construction of the access floor.
Figure 7:
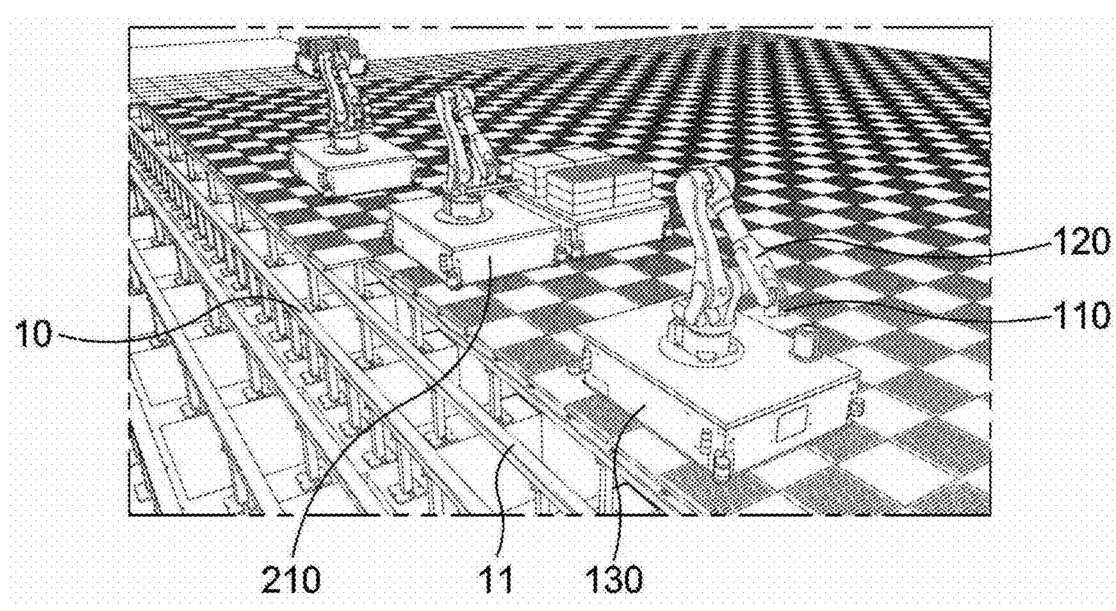
Figure 8:
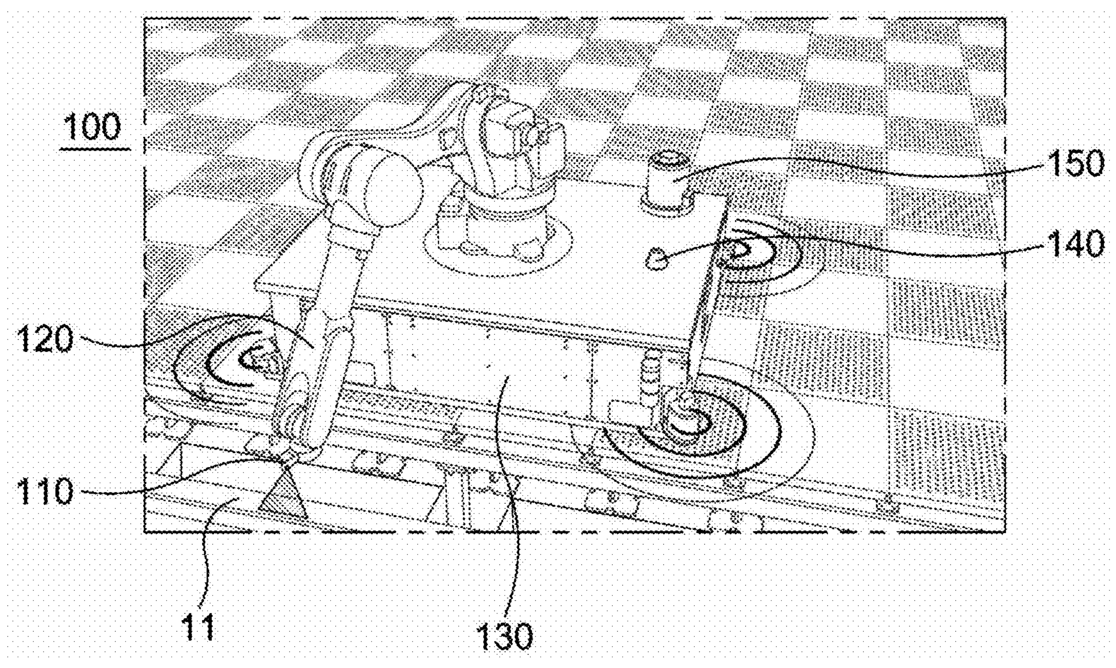
FIGS. 8 to 11 are views illustrating a process in which the pad installation robot attaches a pad to the installation frame.
Figure 9:
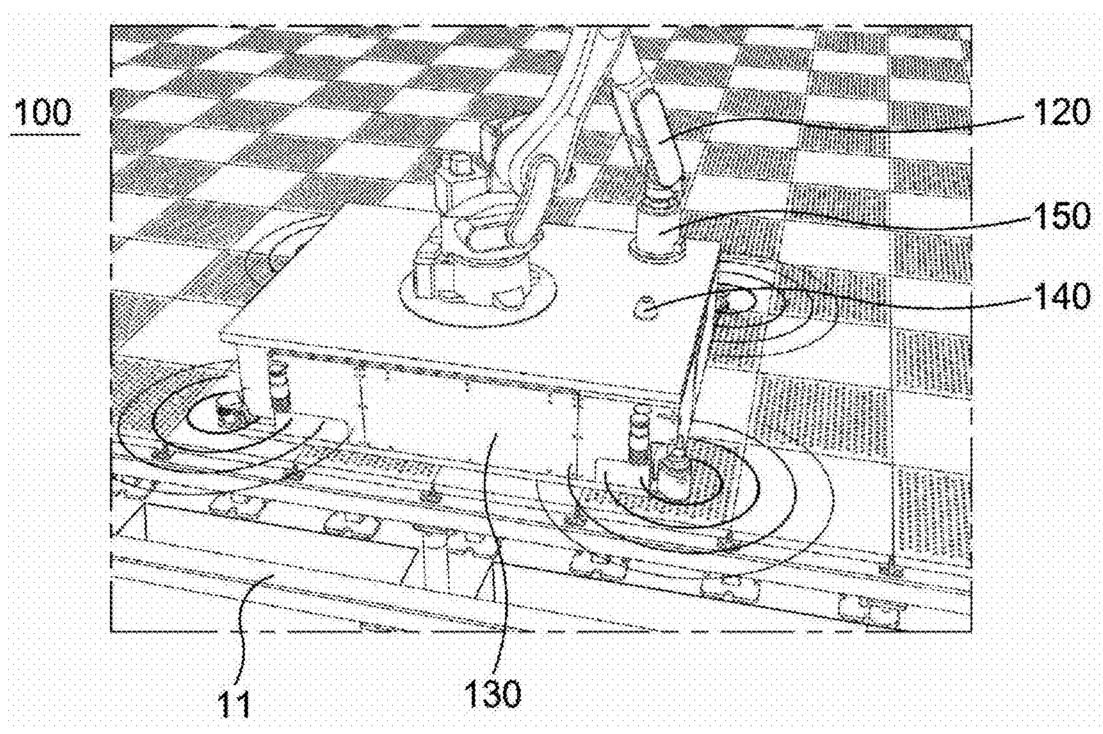
Figure 10:
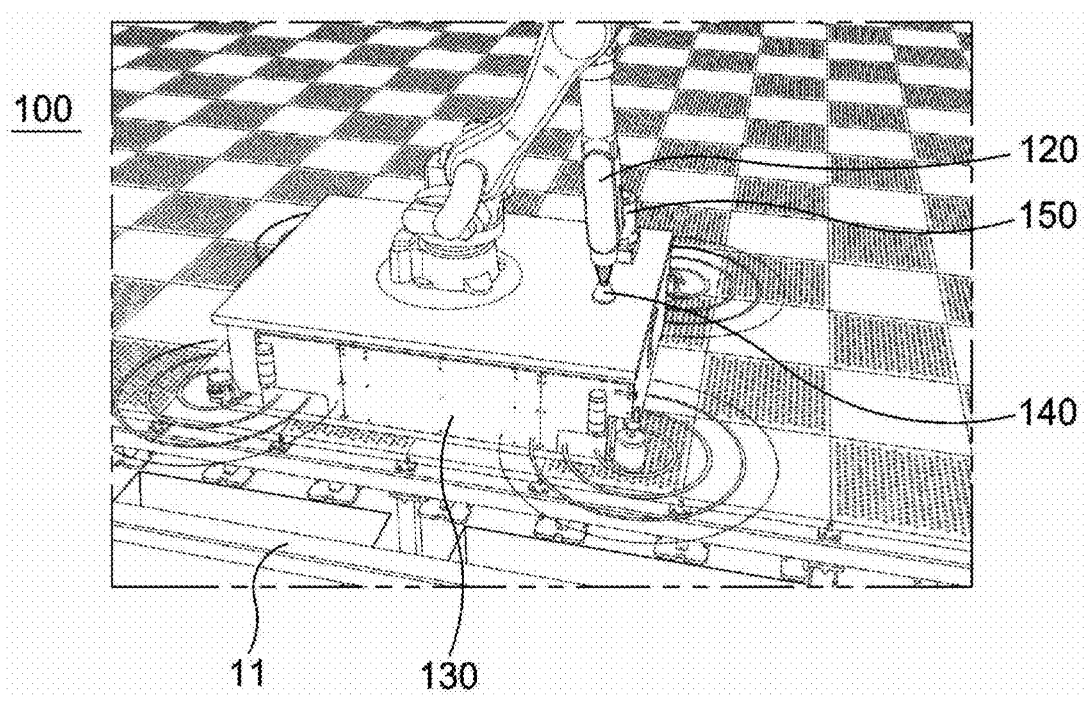
Figure 11:
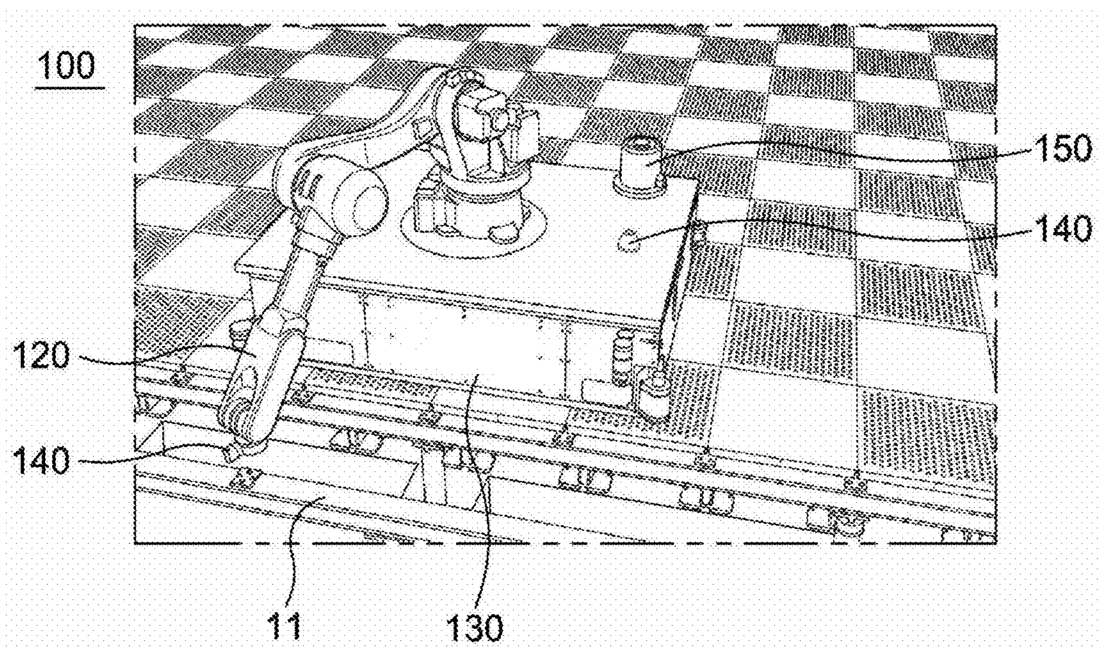
Figure 12:
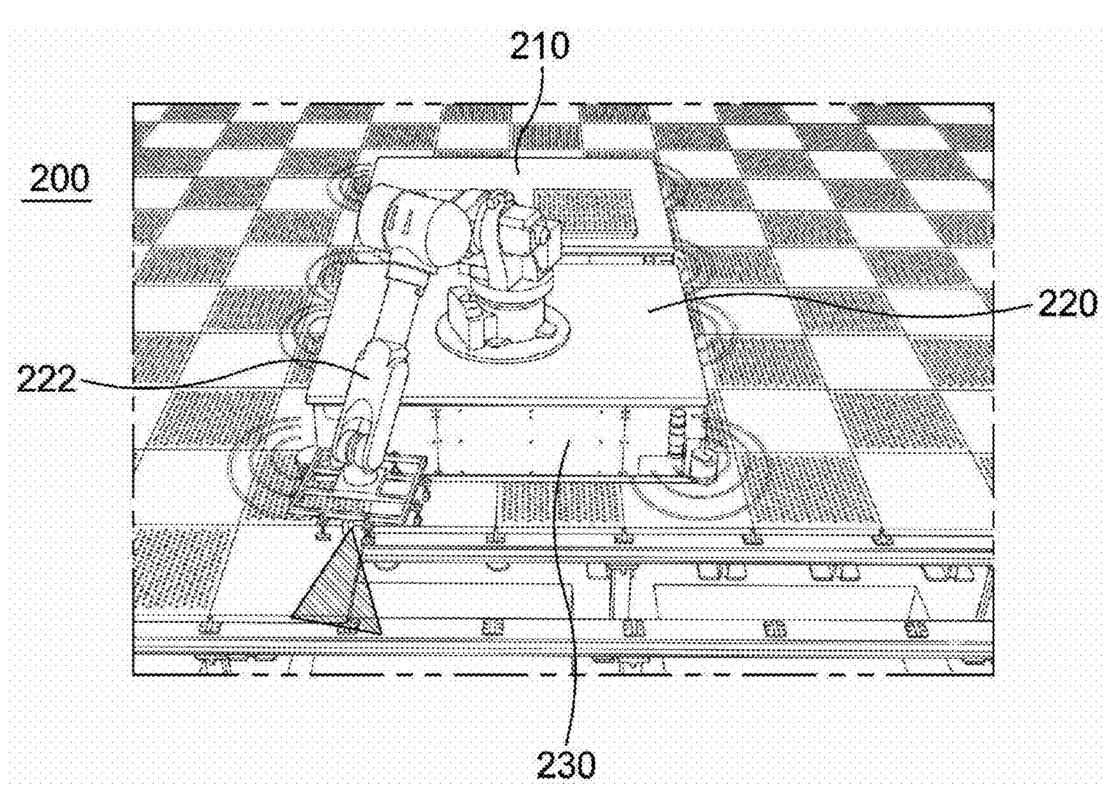
FIGS. 12 to 20 are views illustrating a process in which the floor installation robot mounts a floor on the pad.
Figure 13:
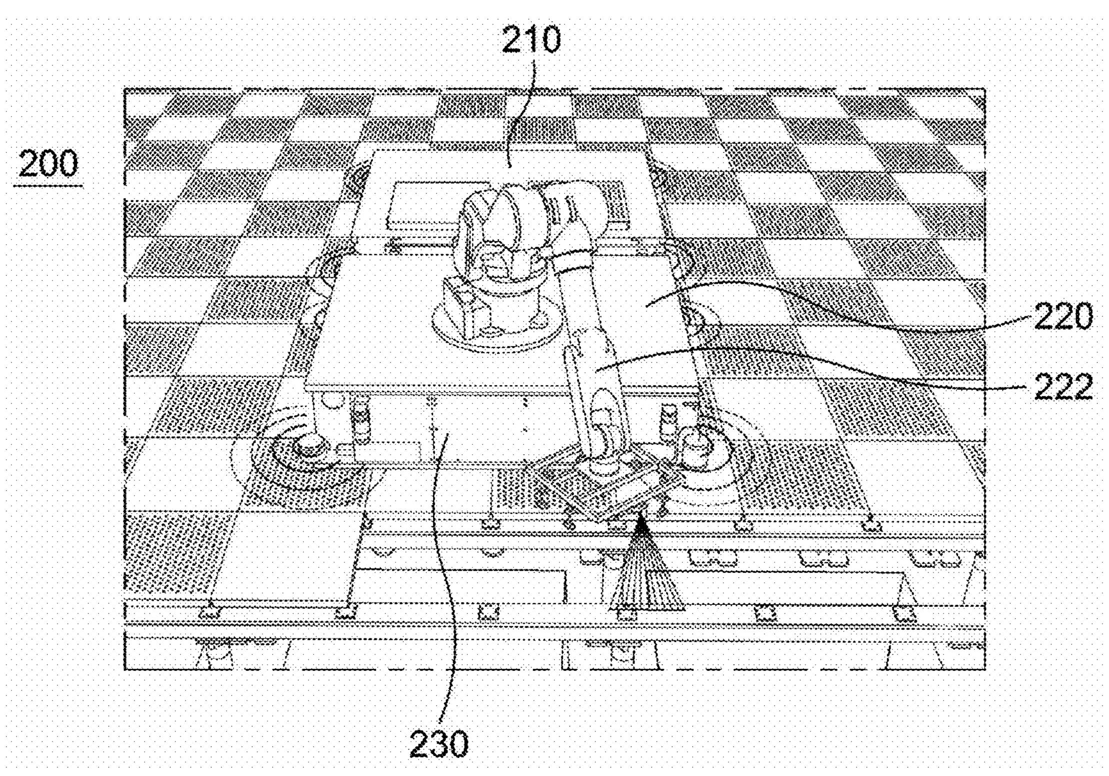
Figure 14:
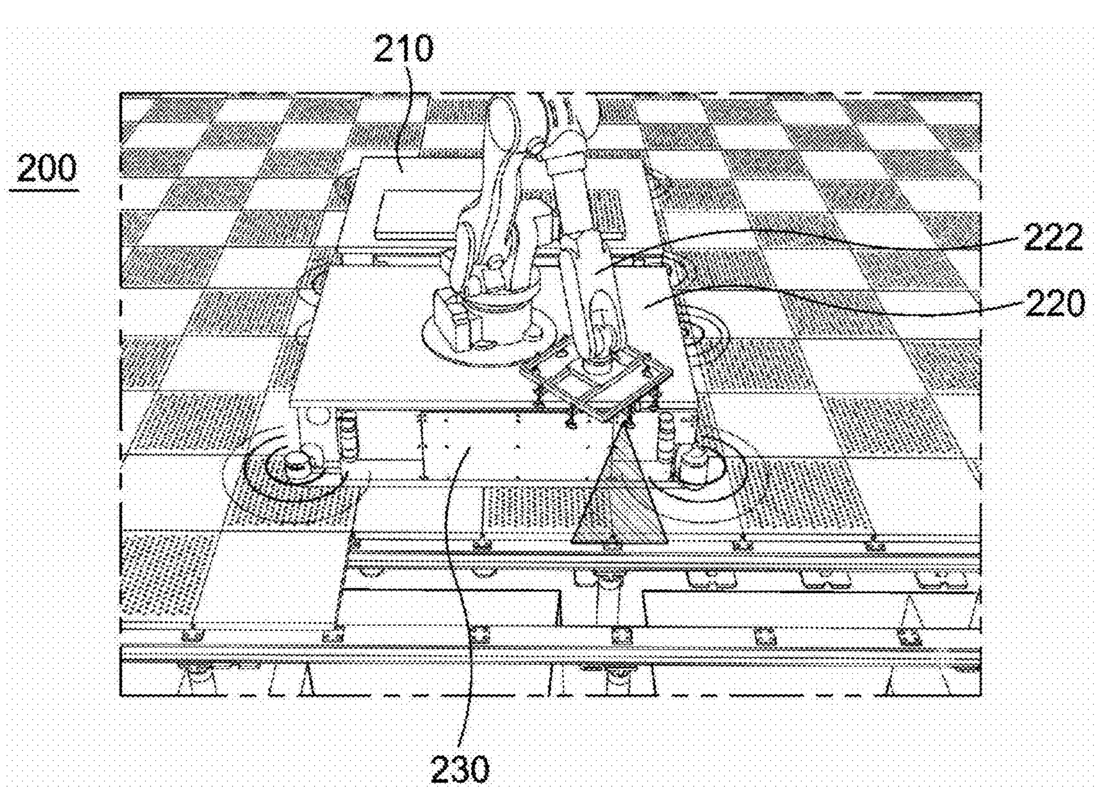
Figure 15:
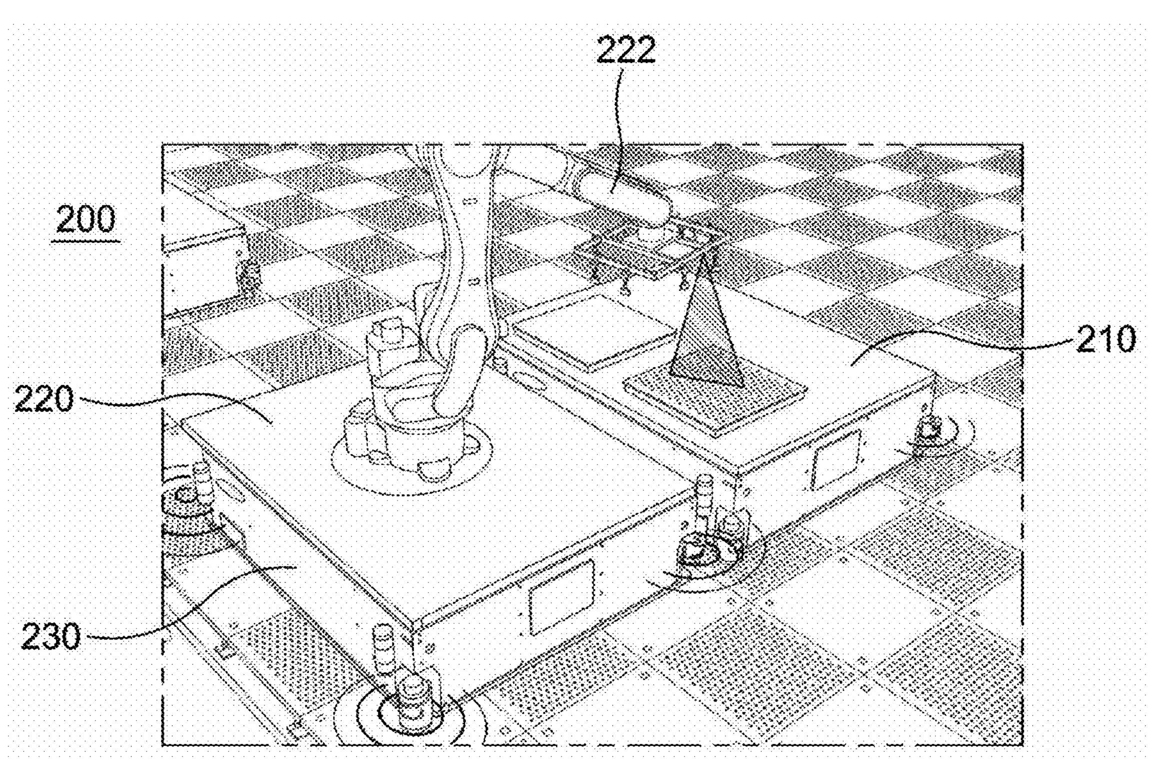
Figure 16:
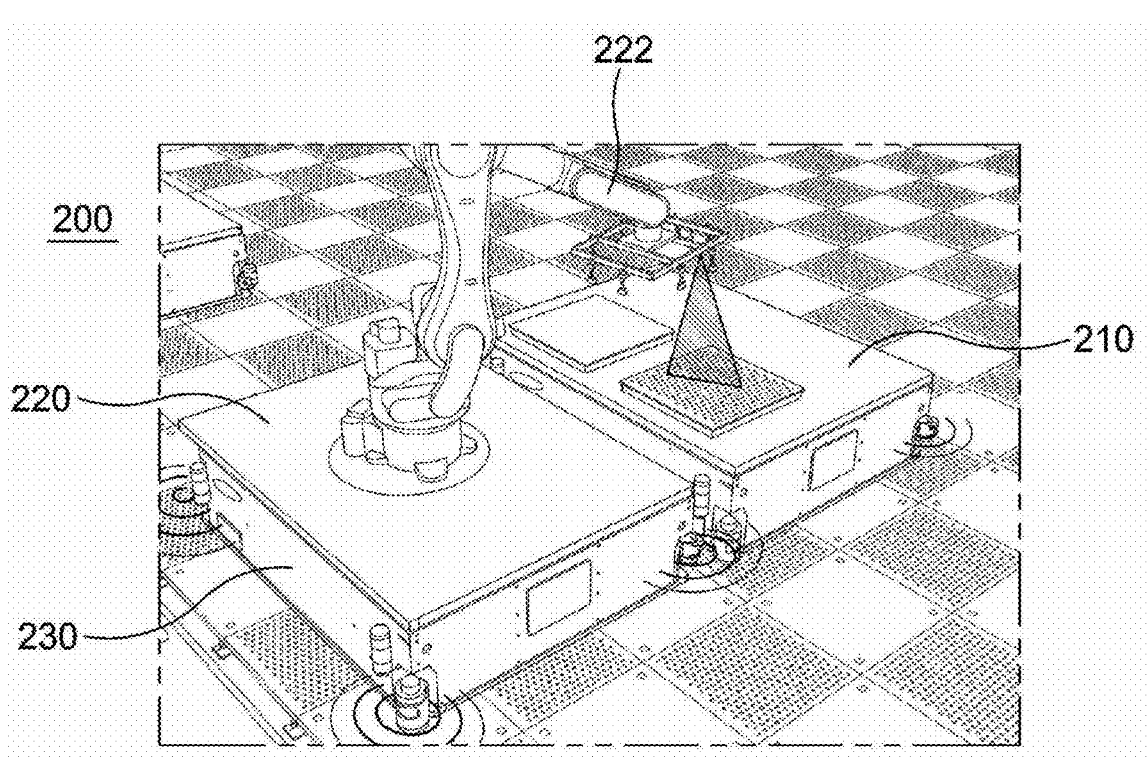
Figure 17:
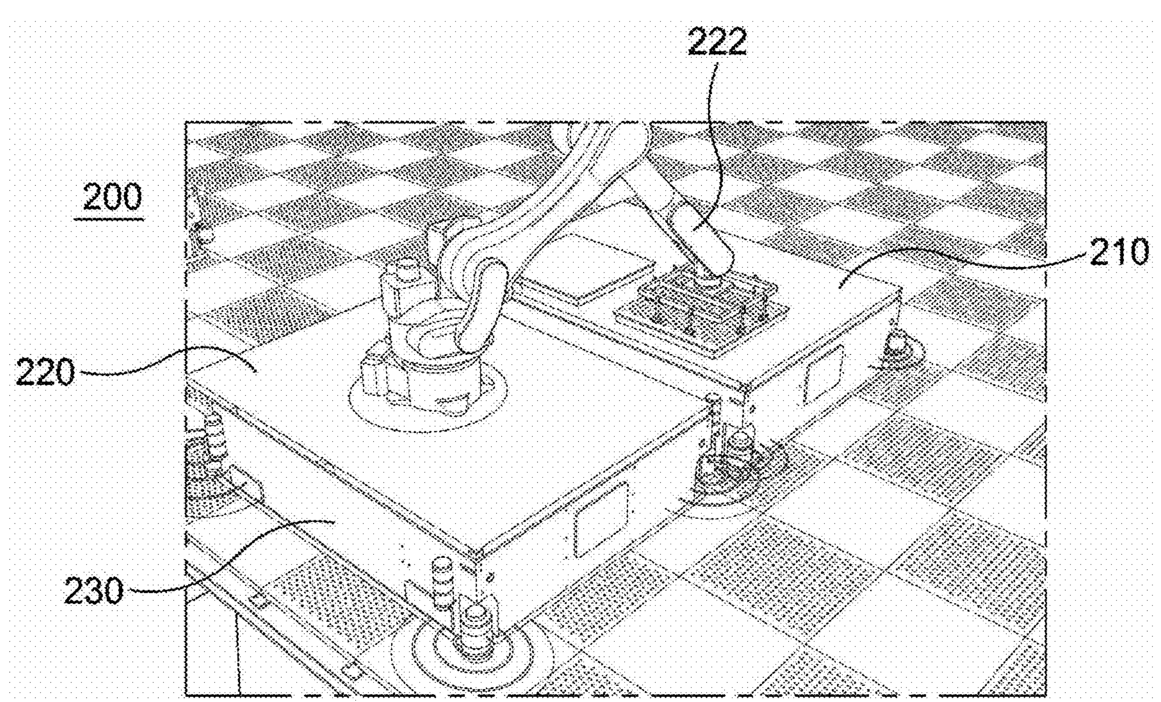
Figure 18:
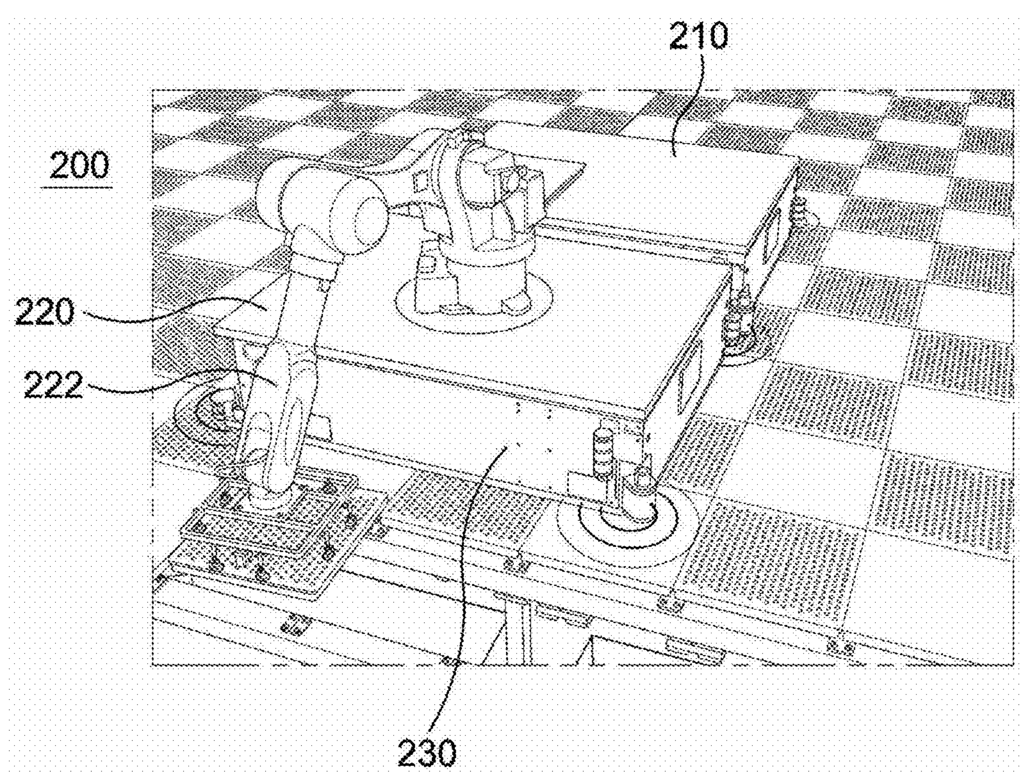
Figure 19:
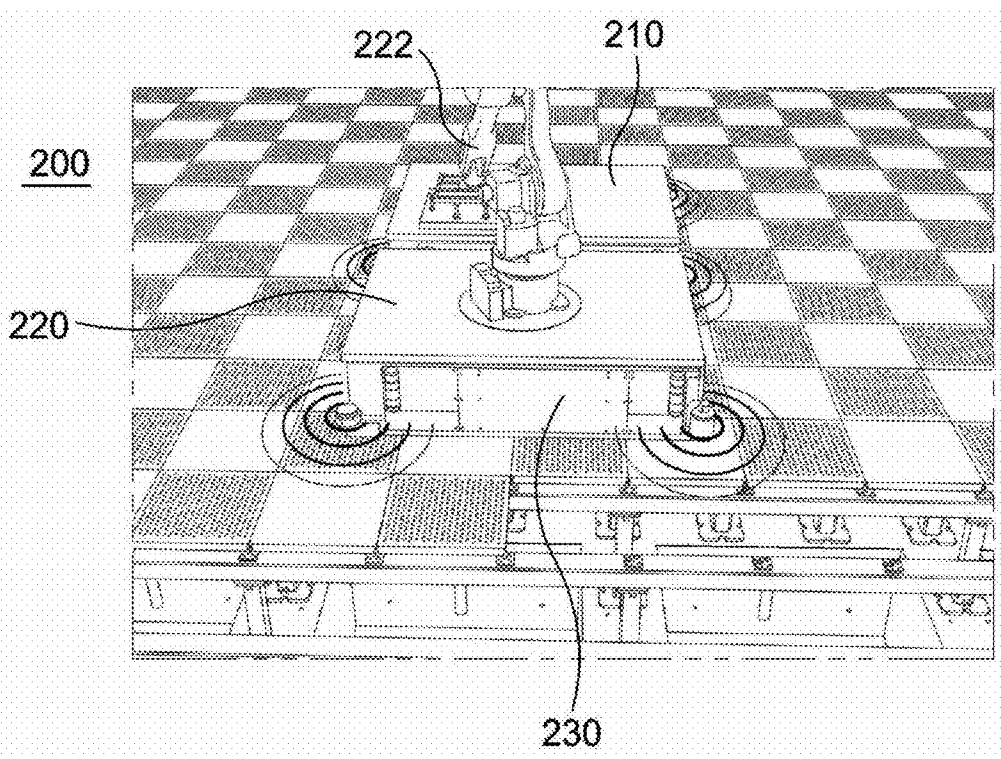
Figure 20:
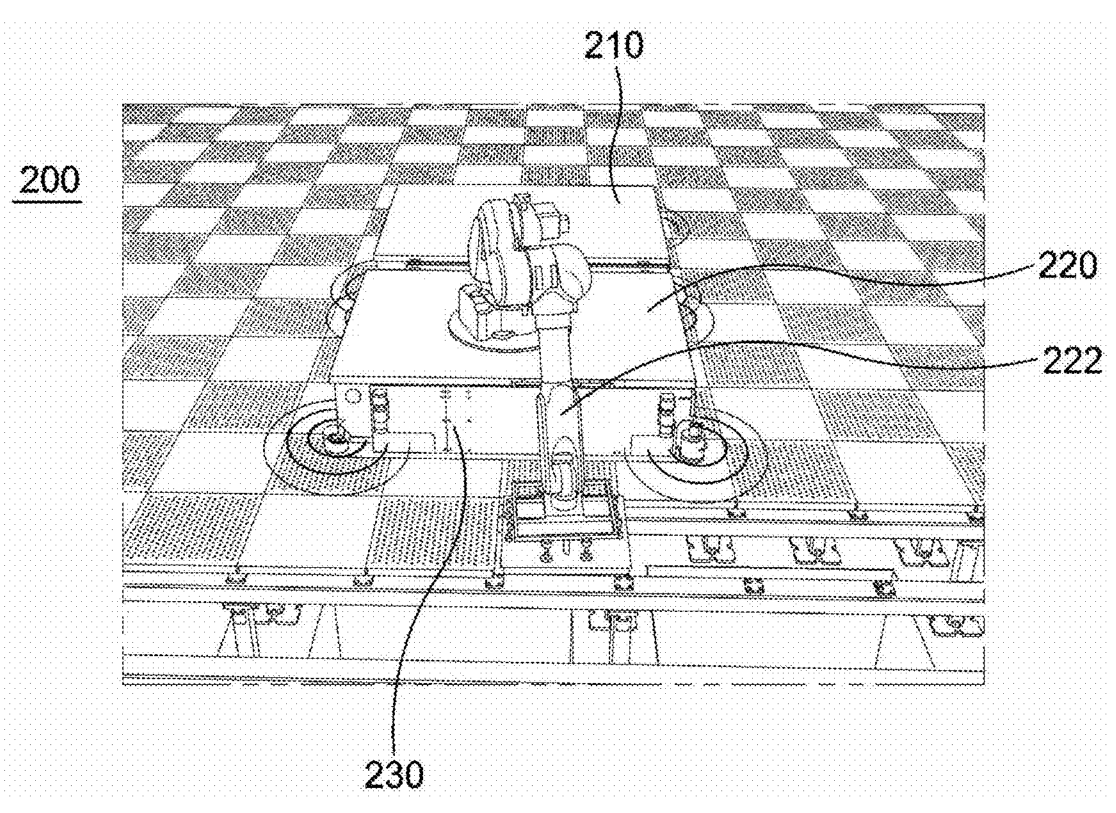

To this end, the floor installation robot 200 may include a transportation unit 210 transporting the floor 30 in a loaded state and an installation unit 220 mounting the floor 30 on the transportation unit 210 to the pad 20 (refer to FIG. 6).

*Since the floor 30 is a large construction material with a heavy weight, when the floor 30 is loaded and transported in one unmanned robot, a size of the unmanned robot may increase, and construction efficiency may decrease.

Thus, in the present invention, the transportation unit 210 loading and transporting the floor 30 is separately provided to load and transport the floor 30 around the installation unit 220.

Alternatively, the transportation unit 210 and the installation unit 220 may be integrated into a single unit depending on circumstances.

Figure 3:
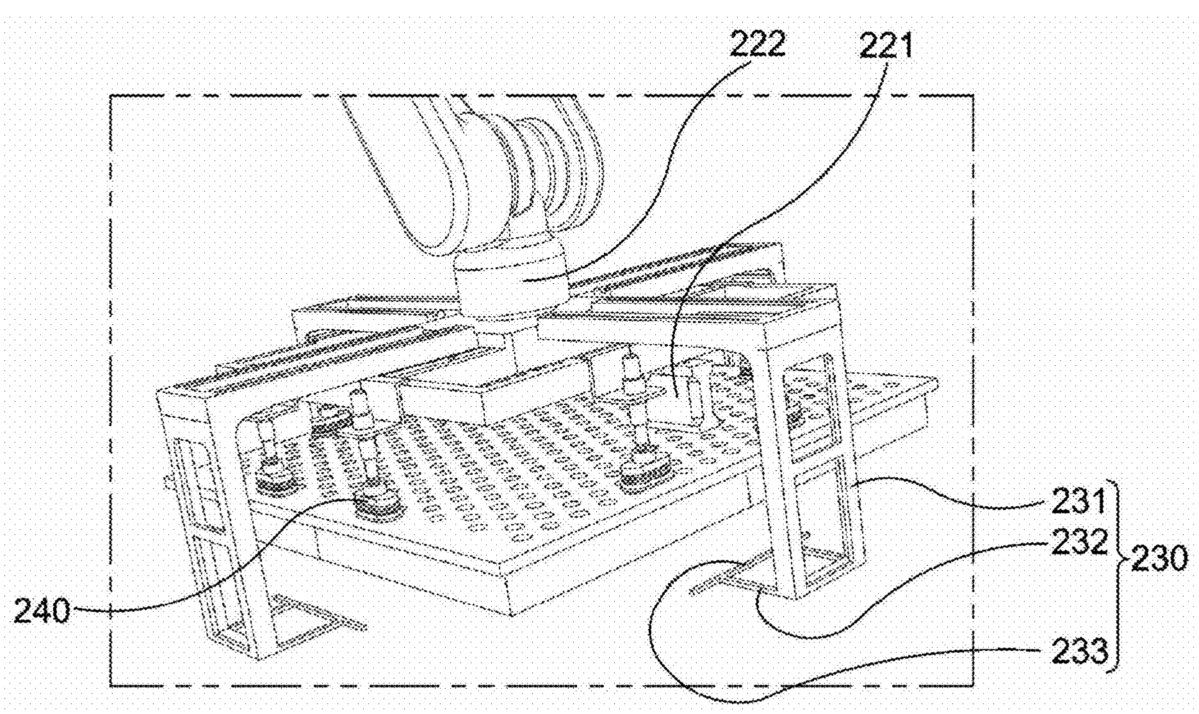
FIG. 3 is detail view illustrating a second installation arm of a floor installation robot according to an embodiment of the present invention.

The installation unit 220 may include a second detection sensor 221 sensing a mounting position 12 of the floor 30, a second installation arm 222 moving the floor 30 to the mounting position 12, and a second transportation means 230 moving the second installation arm 222 (refer to FIG. 3).

Components corresponding to the first gripper 121 and the second gripper 122 of the above-described pad installation robot 100 may be also formed on the second installation arm 222 of the installation unit 220, and in this case, an object to be installed is changed from the pad 20 to the floor 30.

Figure 21:
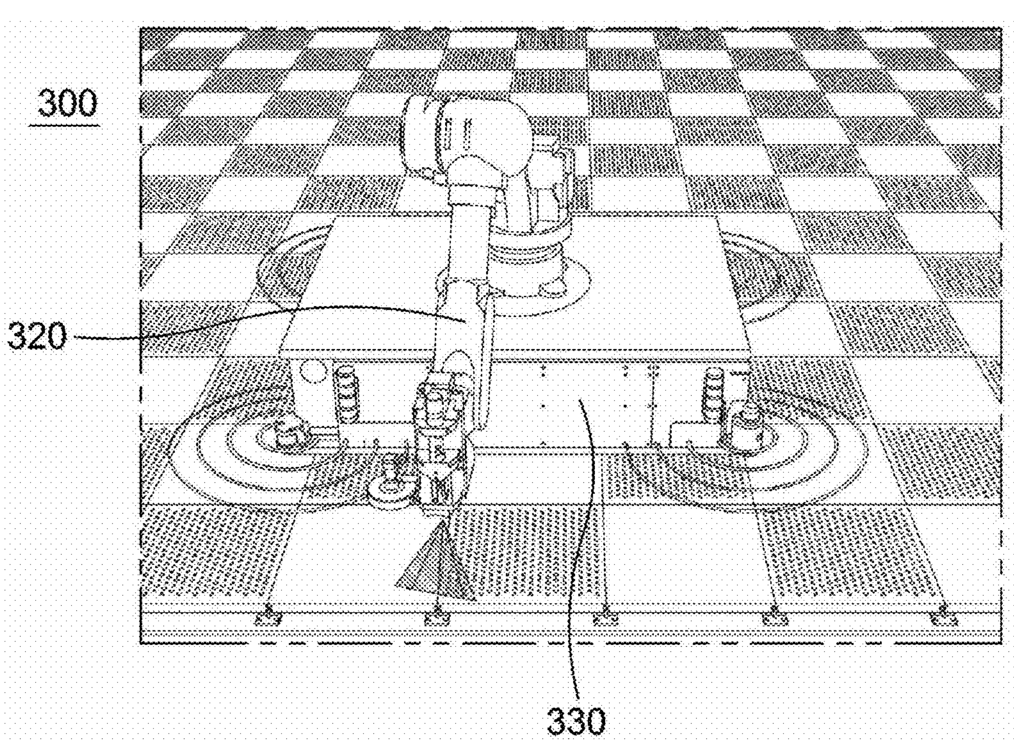
FIGS. 21 to 22 are views illustrating a process in which the bolting robot fastens the pad and the floor by using a fastening means.
Figure 22:
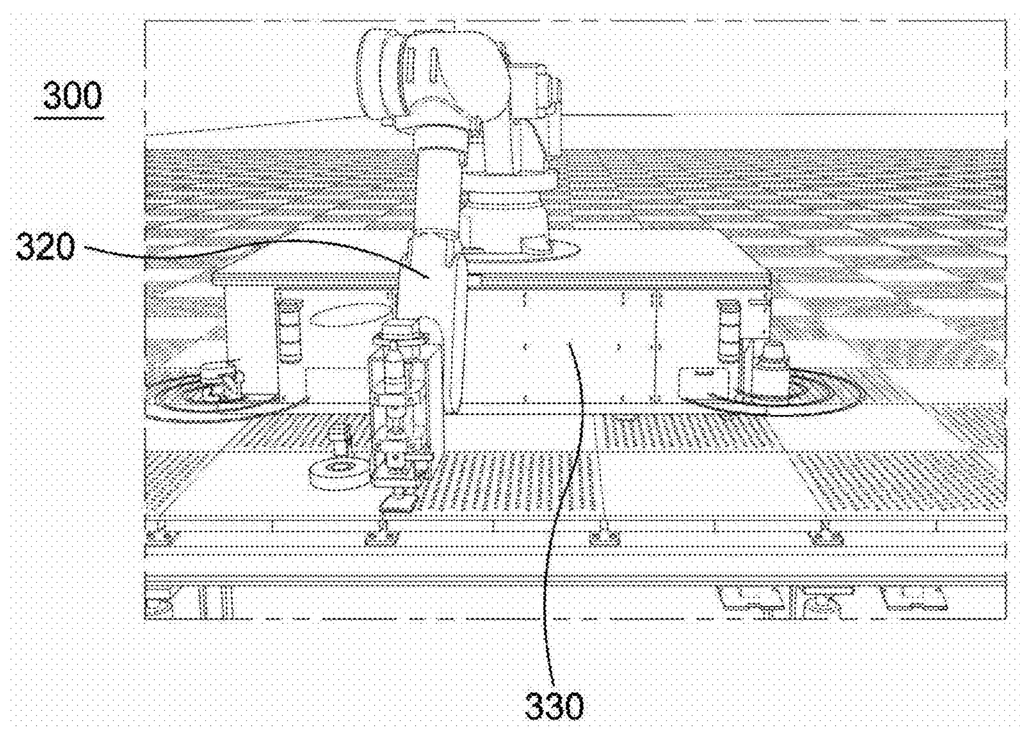

The bolting robot 300 serves to fasten the floor 30 to the pad 20 by using the fastening means 40 (refer to FIGS. 21 to 22).

Figure 4:
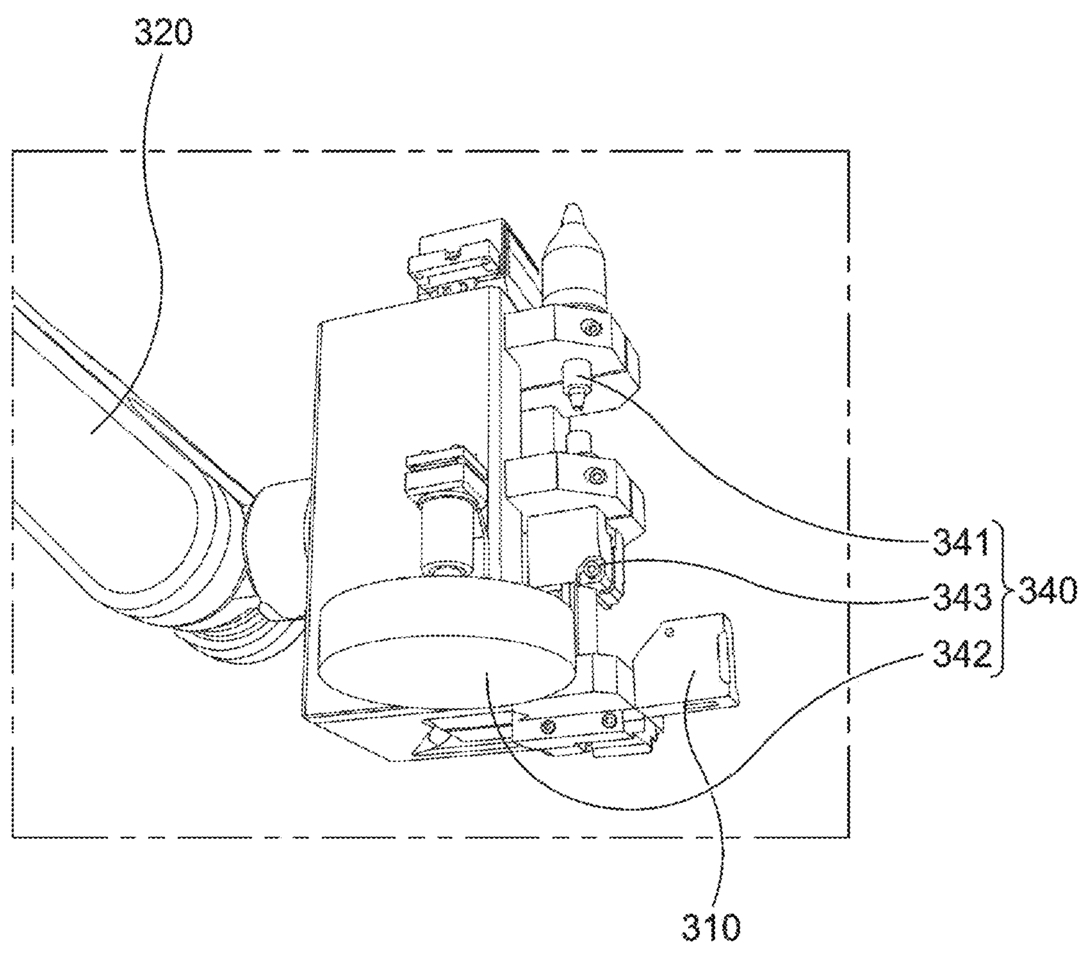
FIG. 4 is detail view illustrating a third installation arm of a bolting robot according to an embodiment of the present invention.

To this end, the bolting robot 300 may include a third detection sensor 310 sensing an insertion hole 13 to which the fastening means 40 is inserted, a third installation arm 320 moving the fastening means 40 to the insertion hole 13, and a third transportation means 330 moving the third installation arm 320 (refer to FIG. 4).

In general, the fastening means 40 is a bolt 41, and the insertion hole 13 is defined in the pad 20 and the floor 30. In this case, the bolting robot 300 may include a bolting part 340 fastening the bolt 41 to the insertion hole 13.

The unmanned robot including the pad installation robot 100, the floor installation robot 200, and the bolting robot 300 may include a position sensor 410 and a distance sensor 420.

Since the unmanned construction system for the access floor according to the present invention includes a plurality of unmanned robots, a position and a distance of an individual unmanned robot and contents of a work to be performed at the corresponding position may be controlled through the position sensor 410 and the distance sensor 420 mounted to each unmanned robot.

The operation module contained in the control server 1 defines operation contents of the unmanned robot by using information generated in the position sensor 410 and the distance sensor 420 of the unmanned robot.

The method for constructing the access floor by using the unmanned robot according to an embodiment of the present invention includes: a first step S100 of constructing an installation frame 10 and a peripheral slab 60 formed on a periphery of the installation frame 100; a second step S200 of positioning the unmanned robot on the peripheral slab 60; and a third step S300 of coupling the floor 30 to the installation frame 10 by the unmanned robot while moving along the peripheral slab 60.

Figure 24:
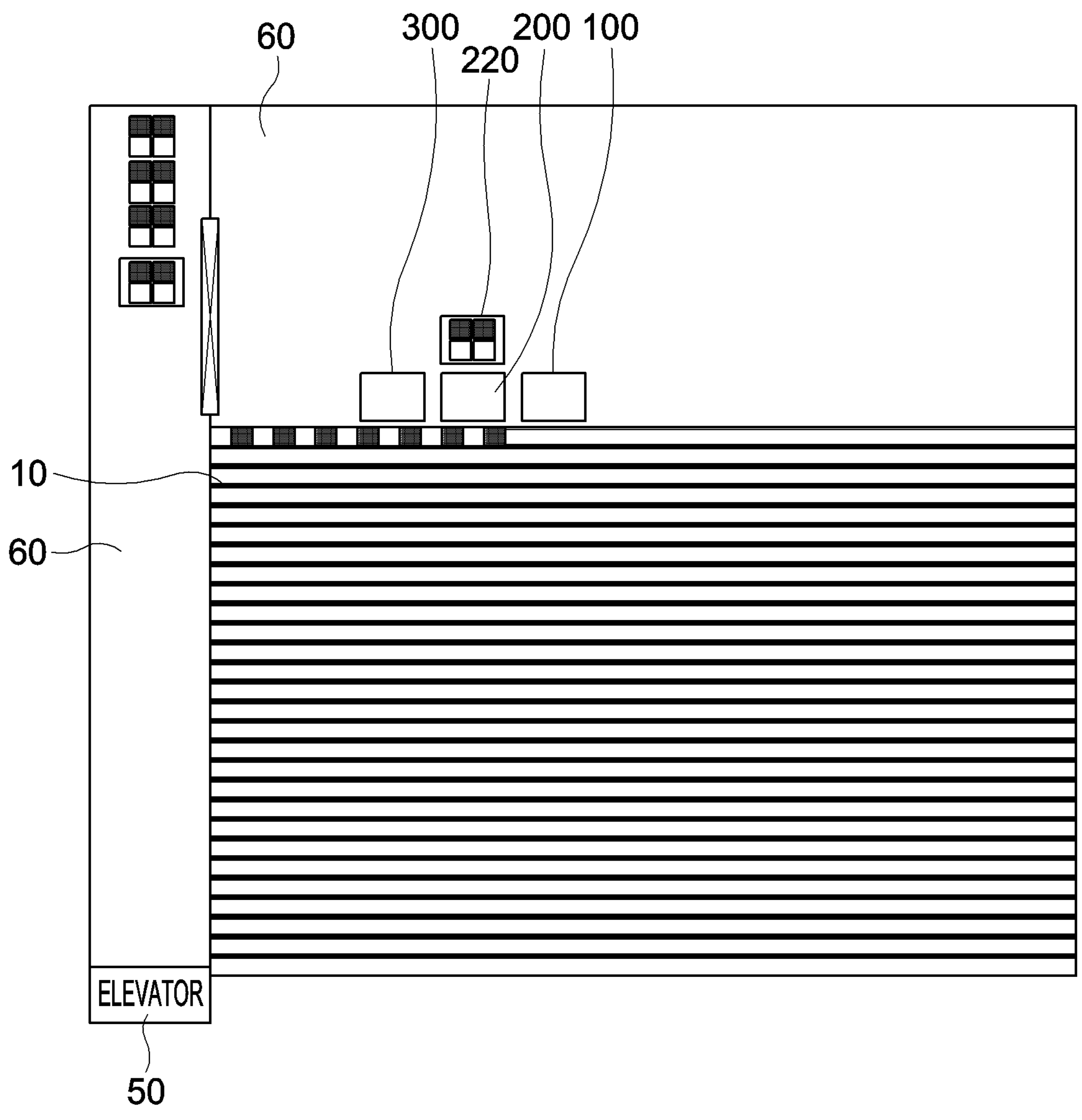
FIGS. 24 to 26 are views illustrating a movement path of the unmanned robot according to an embodiment of the present invention.
Figure 25:
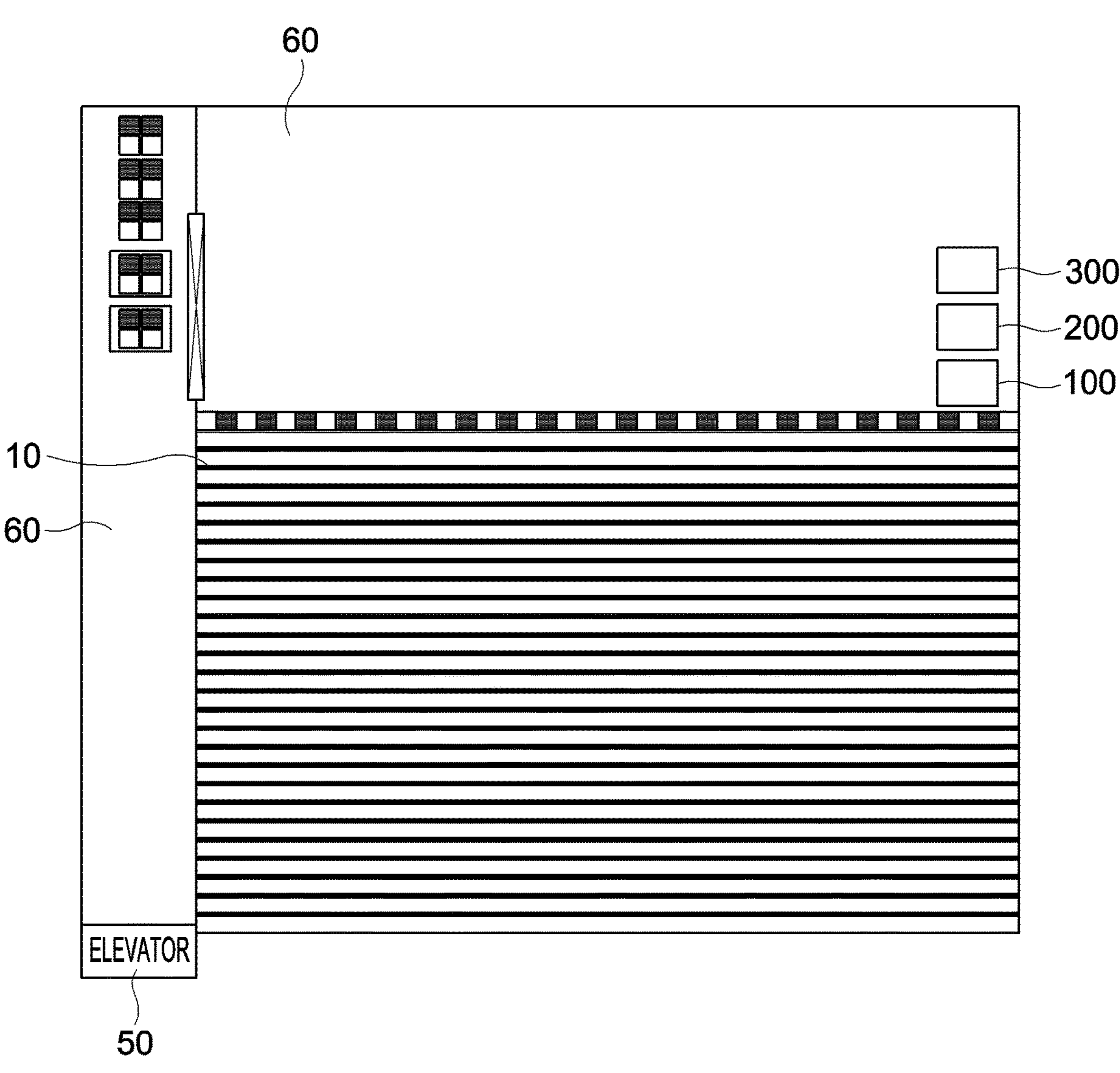
Figure 26:
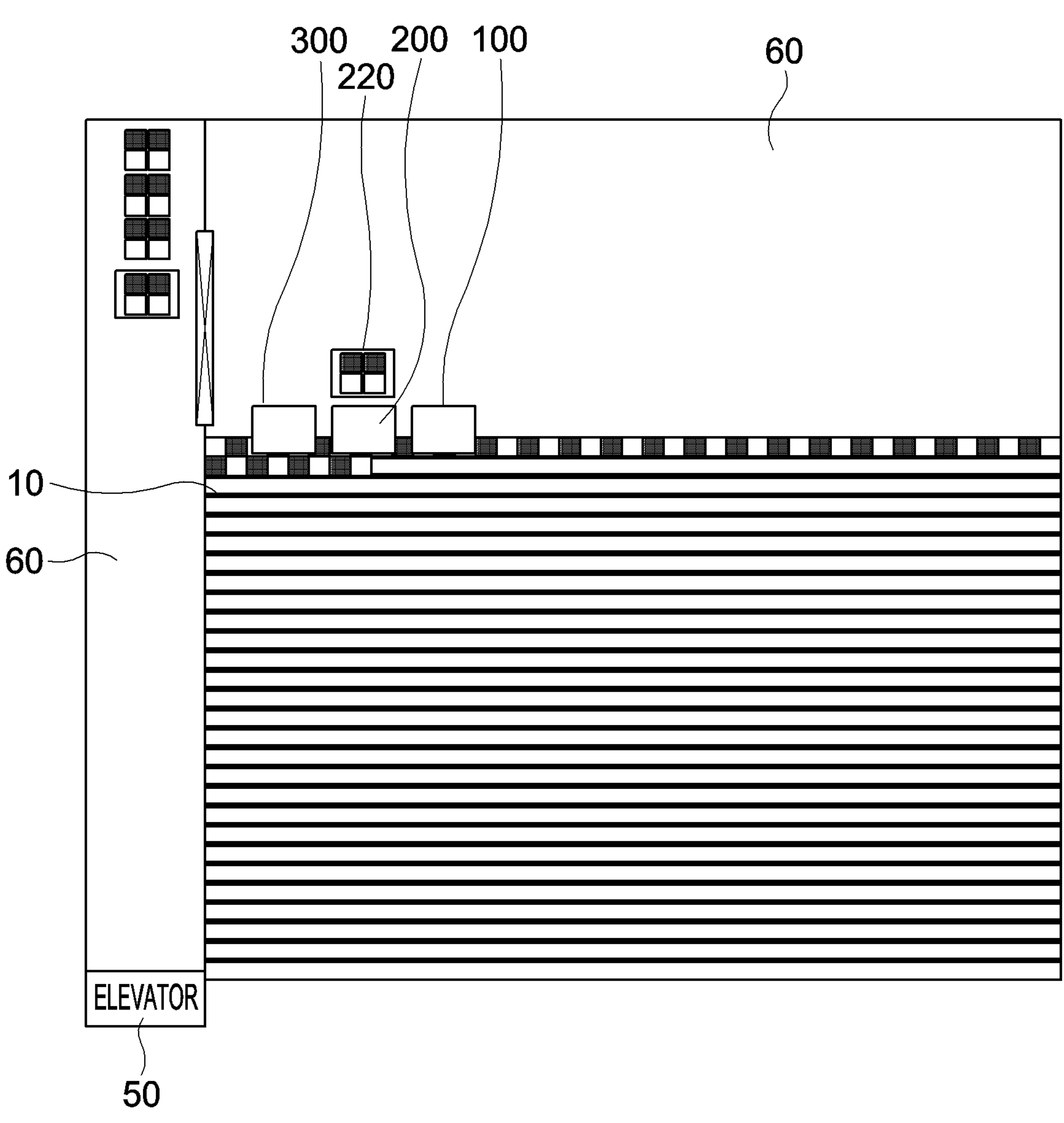
Figure 27:
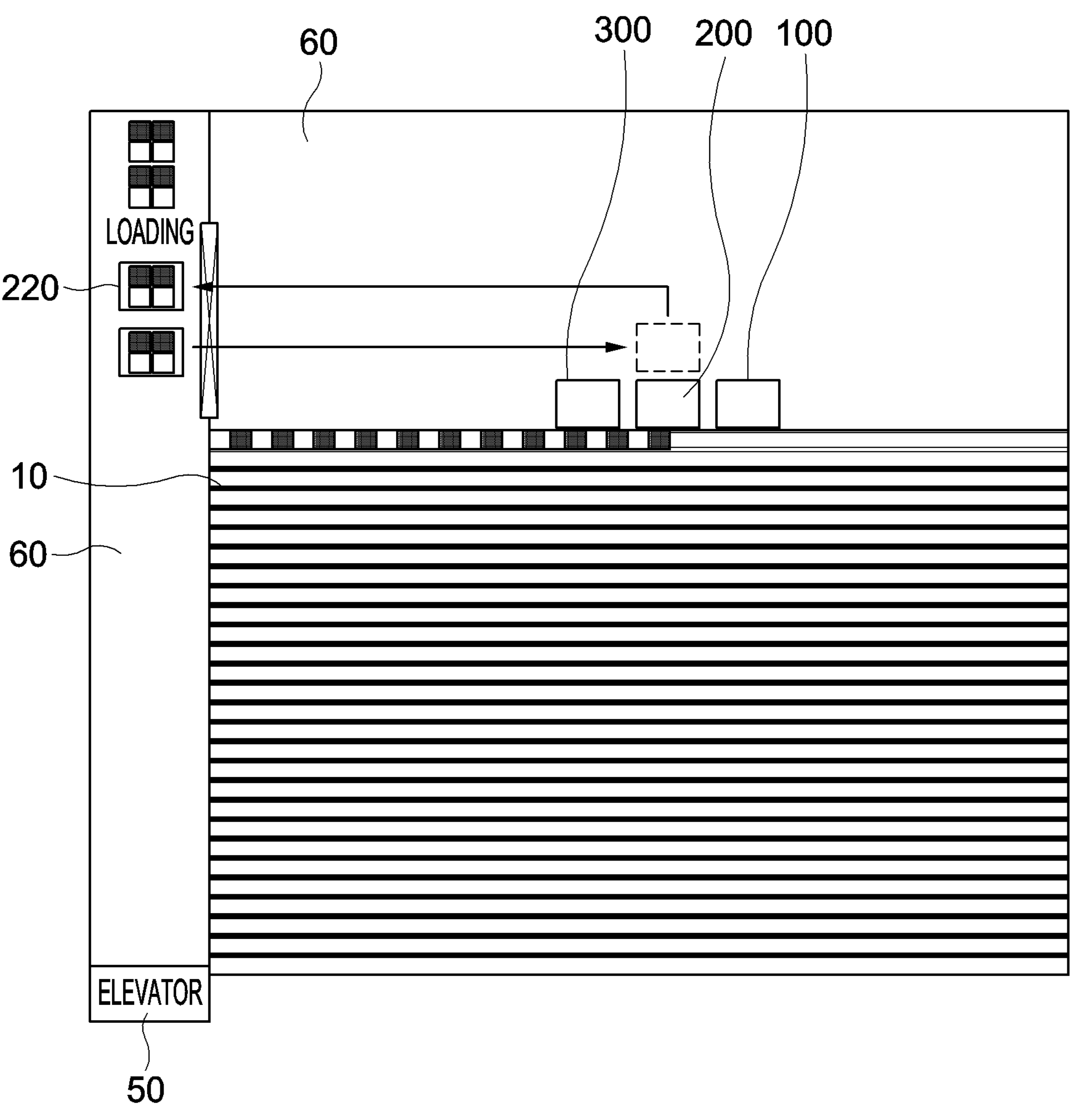
FIG. 27 is a view illustrating a movement path of a transportation unit of the pad installation robot according to an embodiment of the present invention.
Figure 28:
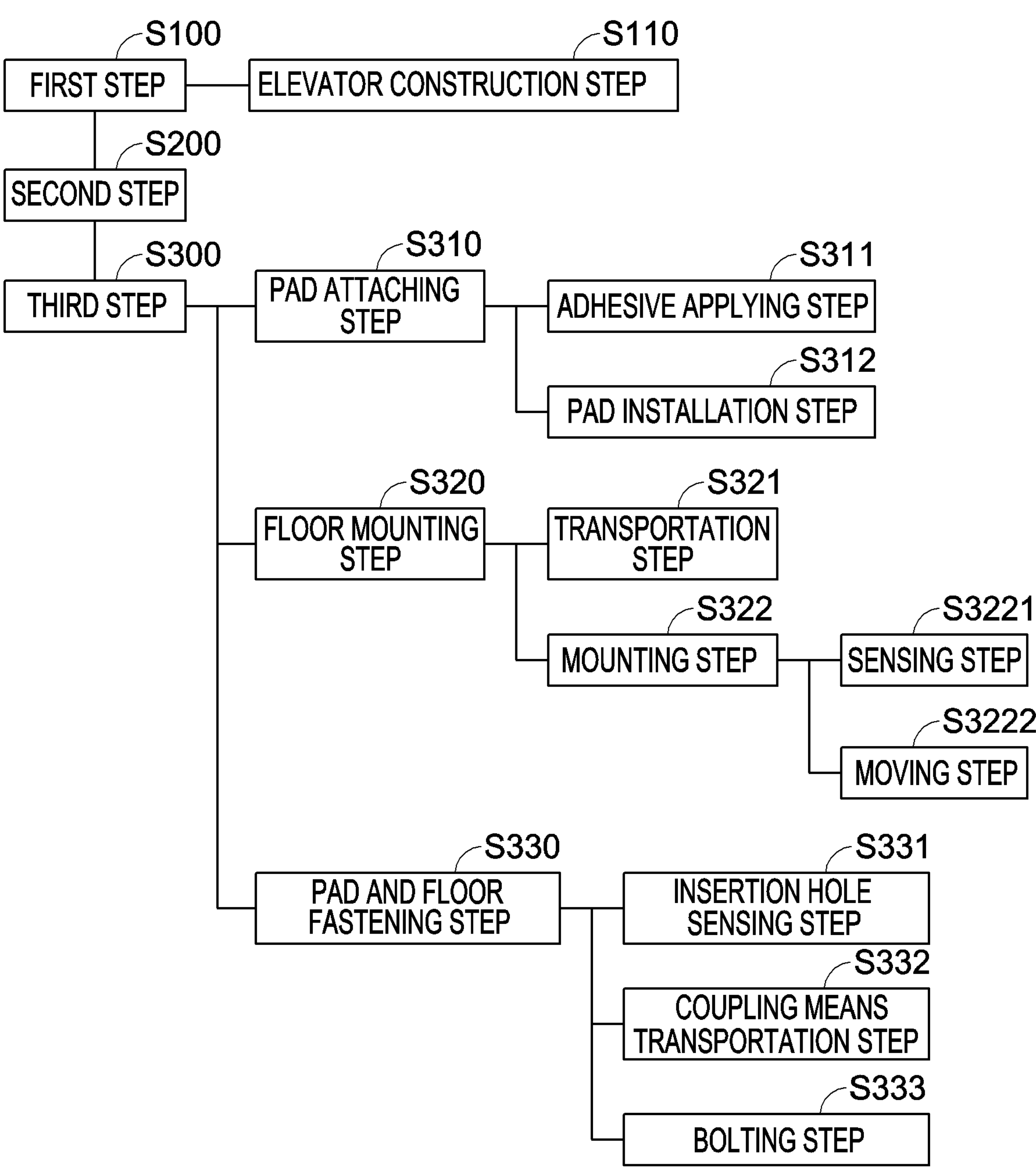
FIG. 28 is a flowchart illustrating a method for constructing an access floor according to an embodiment of the present invention.

The unmanned robot installs the floor 30 in a predetermined direction and repeatedly performs the third step S300 to construct the access floor (FIGS. 24 to 26).

When the peripheral slab 60 is formed at a high floor, the first step S100 may include an elevator construction step S110 of constructing the elevator 50 transporting the unmanned robot to a level of the peripheral slab 60.

The third step S300 may include a pad attaching step S310 of attaching the pad 20 to the installation frame 10 by using the pad installation robot 100, a floor mounting step S320 of mounting the floor 30 to the pad 20 by using the floor installation robot 200, and a pad and floor fastening step S330 of fastening the pad 20 and the floor 30 by using the fastening means 40 of the bolting robot 300.

In this case, the pad attaching step S310 may include an adhesive applying step S311 of gripping the pad 20 by the first installation arm 120 to apply the adhesive supplied from the adhesive supply part 140 to a rear surface of the pad 20 and a pad installation step S312 of transporting the pad 20 by the first installation arm 120 so that the rear surface of the pad 20 contacts a top surface of the installation frame 10.

Also, the floor mounting step S320 may include a transportation step S321 of moving the floor 30 to a periphery of the installation unit 220 by using the transportation unit 210 and a mounting step S322 of mounting the floor 30 loaded on the transportation unit 210 to the pad 20 by using the installation unit 220.

The mounting step S322 may include a sensing step S3221 of sensing the mounting position 12 of the floor 30 by using the second detection sensor 221 and a moving step S3222 of moving the floor 30 loaded on the transportation unit 210 to the mounting position 12 by using the second installation arm 222.

The pad and floor fastening step S330 may include an insertion hole sensing step S331 of sensing the insertion hole 121 by using the third detection sensor 310, a fastening means transportation step S332 of moving the fastening means 40 to the insertion hole 13 by using the third installation arm 320, and a bolting step S333 of fastening the fastening means 40 to the insertion hole 13 by using the bolting part 340.

The bolting robot 300 according to an embodiment of the present invention may further include a horizontal level measuring part 350 measuring a horizontal level of the floor 30 (refer to FIG. 4).

In this case, the pad and floor fastening step S330 may be performed only when a horizontal level A measured by the horizontal level measuring part 350 is within a predetermined value. Accordingly, the bolting robot 300 may maintain an overall horizontal level of the floor 30 within a predetermined error range because the construction is performed in a method of fastening the next floor 30 to the pad 20 while maintaining the horizontal level of the constructed floor 30 within a predetermined value.

Thus, the access floor constructed by the method for constructing the access floor according to an embodiment of the present invention has an advantage capable of securing a high horizontal level construction quality.

The horizontal level measuring part 350 may use all sorts of methods capable of measuring the horizontal level such as a level sensor.

The method for constructing the access floor according to the present invention performs a minimum construction including only the elevator 50 for movement of the unmanned robot and the peripheral slab 60 formed on the periphery of the installation frame 10 by manpower and then performs the construction for forming the access floor by the unmanned robot to exhibit an effect of increasing a quality and efficiency of the access floor construction and remarkably decreasing a risk of occurrence of a safety accident or damage of the worker.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

INDUSTRIAL APPLICABILITY

The present invention has industrial applicability in relation to the construction of the access floor.

10: Installation frame
20: Pad
30: Floor
100: Pad installation robot
200: Floor installation robot
300: Bolting robot

The invention claimed is:

1. A method for constructing an access floor using a plurality of unmanned robots controlled via a control server, the method comprising:

causing, at least in part, construction of an installation frame and a peripheral slab on a periphery of the installation frame;

causing, at least in part, at least one unmanned robot of the plurality of unmanned robots to be positioned on the peripheral slab; and causing, at least in part, a floor to be coupled to the installation frame using the at least one unmanned robot as part of the at least one unmanned robot moves along the peripheral slab;

wherein the plurality of unmanned robots comprises:

a pad installation robot configured to attach a pad to the installation frame;

a floor installation robot configured to mount the floor on the pad; and a fastening robot configured to fasten the pad and the floor using a fastener, and wherein causing, at least in part, the floor to be coupled to the installation frame comprises:

causing, at least in part, the pad installation robot to attach the pad to the installation frame;

causing, at least in part, the floor installation robot to mount the floor to the pad; and causing, at least in part, the fastening robot to fasten the pad and the floor using the fastener.

2. The method of claim 1, wherein the pad installation robot comprises:

a first detection sensor configured to sense an installation position of the pad on the installation frame;

a first installation arm configured to move the pad to the installation position;

a first transporter configured to move the first installation arm; and an adhesive supply part configured to supply an adhesive to a bottom surface of the pad, wherein causing, at least in part, the pad to be attached to the installation frame comprises:

causing, at least in part, the pad to be gripped using the first installation arm and the adhesive to be supplied from the adhesive supply part to the bottom surface of the pad; and causing, at least in part, the first installation arm to position the pad such that the bottom surface of the pad contacts a top surface of the installation frame.

3. The method of claim 2, wherein the floor installation robot comprises:

a transportation unit configured to transport the floor in a loaded state; and an installation unit configured to mount the floor disposed on the transportation unit to the pad, wherein causing, at least in part, the floor to be mounted to the pad comprises:

causing, at least in part, the floor to be moved to a periphery of the installation unit using the transportation unit; and causing, at least in part, the floor loaded on the transportation unit to be mounted on the pad using the installation unit.

4. The method of claim 3, wherein the installation unit comprises:

a second detection sensor configured to sense a mounting position of the floor;

a second installation arm configured to move the floor to the mounting position; and a second transporter configured to move the second installation arm, wherein causing, at least in part, the floor loaded on the transportation unit to be mounted on the pad comprises:

causing, at least in part, the mounting position of the floor to be sensed using the second detection sensor; and causing, at least in part, the floor loaded on the transportation unit to be moved to the mounting position using the second installation arm.

5. The method of claim 4, wherein the fastening robot comprises:

a third detection sensor configured to sense an insertion hole into which the fastener is to be inserted;

a third installation arm configured to move the fastener to the insertion hole; and a third transporter configured to move the third installation arm, wherein causing, at least in part, the fastening robot to fasten the pad and the floor using the fastener comprises:

causing, at least in part, the insertion hole to be sensed using the third detection sensor; and causing, at least in part, the fastener to be moved to the insertion hole using the third installation arm.

6. The method of claim 5, wherein the fastening bolting robot further comprises a bolting part configured to fasten the fastener to the insertion hole, and causing, at least in part, the fastening robot to fasten the pad and the floor using the fastener further comprises fastening the fastener to the insertion hole using the bolting part.

7. The method of claim 6, wherein the fastening robot further comprises a horizontal level measuring part configured to measure a horizontal level of the floor, and causing, at least in part, the fastening robot to fasten the pad and floor using the fastener is performed only in a case that a horizontal level measured using the horizontal level measuring part is within a predetermined value.

8. The method of claim 6, wherein one or more of the plurality of unmanned robots comprises:

a position sensor configured to generate position information on a current position of one or more of the plurality of unmanned robots; and a distance sensor configured to generate distance information on a distance between at least two of the plurality of unmanned robots.

9. The method of claim 8, wherein causing, at least in part, the construction of the installation frame and a peripheral slab on a periphery of the installation frame comprises causing, at least in part, construction of an elevator configured to transport one or more of the plurality of unmanned robots to a level of the peripheral slab.

10. The method of claim 9, wherein the first installation arm comprises:

a first gripper configured to suction the pad; and a second gripper configured to surround a side surface and a bottom surface of the pad suctioned to the first gripper.

11. The method of claim 10, wherein the first gripper uses vacuum suctioning to suction itself to the pad, the second gripper comprises:

a first guide part protruding from an end of the first installation arm in a downward direction; and a second guide part extending from the first guide part in an inward direction, and the first guide part is hinged with respect to the first installation arm.

12. The method of claim 11, wherein the second guide part is:

hinged in the inward direction in a state in which the pad is suctioned to the first gripper; and hinged in an outward direction in a state in which the pad is separated from the first gripper.

13. The method of claim 12, wherein the pad installation robot further comprises a main body on which the first installation arm is mounted, the adhesive supply part is disposed on the main body, and a discharge hole through which adhesive is discharged is defined in the adhesive supply part.

14. An access floor constructed by the method for constructing the access floor according to claim 1.

* * * * *